(12) United States Patent
Fujimoto et al.

(10) Patent No.: US 11,089,393 B2
(45) Date of Patent: Aug. 10, 2021

(54) LOUDSPEAKER SYSTEM, LOUDSPEAKER SYSTEM COMPONENT, AND AUDIO SYSTEM

(71) Applicant: Panasonic Intellectual Property Management Co., Ltd., Osaka (JP)

(72) Inventors: Keisuke Fujimoto, Osaka (JP); Koji Sano, Kanagawa (JP); Yasunori Miyamoto, Osaka (JP); Teppei Koido, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/720,221

(22) Filed: Dec. 19, 2019

(65) Prior Publication Data

US 2020/0128313 A1  Apr. 23, 2020

Related U.S. Application Data

(63) Continuation of application No. PCT/JP2018/024287, filed on Jun. 27, 2018.

(30) Foreign Application Priority Data

Jun. 28, 2017  (JP) .............................. JP2017-126151

(51) Int. Cl.
*H04R 1/02* (2006.01)
*B60R 11/02* (2006.01)
(Continued)

(52) U.S. Cl.
CPC .......... *H04R 1/025* (2013.01); *B60R 11/0217* (2013.01); *H04R 1/023* (2013.01);
(Continued)

(58) Field of Classification Search
CPC ........ H04R 1/025; H04R 1/023; H04R 9/025; H04R 2499/13; B60R 2011/0021; B60R 11/0217; B60J 5/0461
See application file for complete search history.

(56) References Cited

U.S. PATENT DOCUMENTS

| 7,237,825 | B1 * | 7/2007 | Tilli | ........................ B60J 5/0416 |
| | | | | 296/146.7 |
| 2008/0150324 | A1 * | 6/2008 | Jayasuriya | .......... B60R 11/0217 |
| | | | | 296/187.12 |

(Continued)

FOREIGN PATENT DOCUMENTS

| JP | 43-23406 | 10/1943 |
| JP | 6-66194 | 9/1994 |

(Continued)

OTHER PUBLICATIONS

International Search Report dated Sep. 25, 2018 in International (PCT) Application No. PCT/JP2018/024287.

*Primary Examiner* — Jason R Kurr
(74) *Attorney, Agent, or Firm* — Wenderoth, Lind & Ponack, L.L.P.

(57) ABSTRACT

A loudspeaker system includes a housing including a first housing portion and a second housing portion that are plate-shaped and face each other, a loudspeaker drive unit fixed to the first housing portion, and a coupling member that is rigid and couples the first housing portion and the second housing portion to each other inside the housing. The coupling member includes a first end that is directly or indirectly coupled to the first housing portion and a second end that is directly or indirectly coupled to the second housing portion. When second force is applied to the coupling member, the second force being smaller than first force that irreversibly deforms or breaks a coupling portion between the coupling member and the first housing portion, (Continued)

the coupling member is irreversibly deformed or broken so as to shorten a distance between the first end and the second end of the coupling member.

20 Claims, 27 Drawing Sheets

(51) Int. Cl.
    *H04R 9/02*     (2006.01)
    *B60R 11/00*     (2006.01)

(52) U.S. Cl.
    CPC ...... *H04R 9/025* (2013.01); *B60R 2011/0021* (2013.01); *H04R 2499/13* (2013.01)

(56) References Cited

U.S. PATENT DOCUMENTS

| | | | | |
|---|---|---|---|---|
| 2014/0086444 | A1* | 3/2014 | Muller | B60J 5/0418 |
| | | | | 381/389 |
| 2018/0199121 | A1* | 7/2018 | Mittleman | H04R 1/025 |

FOREIGN PATENT DOCUMENTS

| | | |
|---|---|---|
| JP | 11-146471 | 5/1999 |
| JP | 2001-333477 | 11/2001 |
| JP | 2009-273061 | 11/2009 |

* cited by examiner

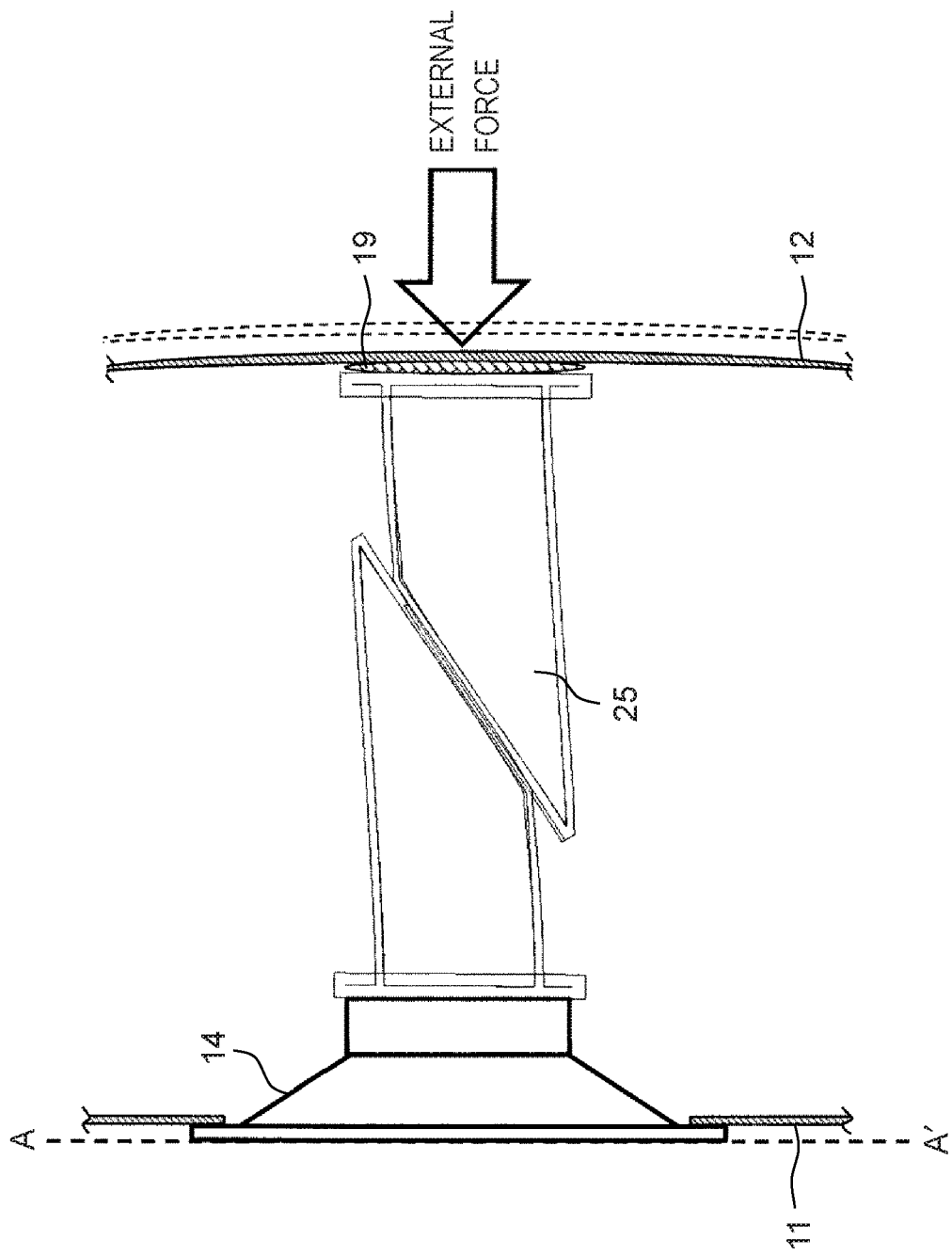

LOUDSPEAKER SYSTEM, LOUDSPEAKER SYSTEM COMPONENT, AND AUDIO SYSTEM

BACKGROUND

1. Technical Field

The present disclosure relates to a loudspeaker system including a loudspeaker drive unit and a housing. The present disclosure further relates to a loudspeaker system component for such a loudspeaker system, and relates to an audio system including at least one of such a loudspeaker system.

2. Description of the Related Art

An audio system mounted on a vehicle such as an automobile includes a loudspeaker drive unit embedded into a body of the vehicle in some cases. The loudspeaker drive unit is fixed to the body of the vehicle, and the body of the vehicle is used as a housing of the loudspeaker system. In this case, the body of the vehicle may generate unnecessary vibration, thereby deteriorating reproduced sound quality.

PTL (Patent Literature) 1 discloses a problem in which when a loudspeaker is directly embedded into an inner space of a vehicle door through an attachment hole in an inner wall panel in the vehicle door having a double wall structure, sound waves inside the inner space cause resonance phenomena, thereby deteriorating acoustics. To solve this problem, PTL 1 discloses a loudspeaker enclosure that can be fixedly embedded into an attachment hole in an inner wall of a vehicle instead of an existing loudspeaker, while removing the existing loudspeaker that has been fixedly embedded into the attachment hole.

PTL 1 is Unexamined Japanese Patent Publication No. 2001-333477. PTL 2 is Japanese Examined Utility Model Application Publication No. S43-023406.

SUMMARY

A vehicle door has a double wall structure including an outer panel and an inner panel to protect passengers when an accident occurs. In terms of safety, when impact force is applied to the vehicle door from outside, the outer panel of the door is desirably collapsed to absorb impact energy, and the inner panel of the door desirably keeps its shape to retain an internal space of the vehicle. With a space provided between the outer panel and the inner panel, even when the outer panel is deformed by external force, deformation of the inner panel can be made smaller than deformation of the outer panel (ideally, deformation of the inner panel can be avoided).

However, when a large-sized structure such as a loudspeaker enclosure is embedded in the internal space in the vehicle door, external force applied to the outer panel is transmitted to the inner panel via the structure in the internal space, so that the inner panel or another member is possibly deformed or broken to be in contact with passengers. Hence, a loudspeaker system that can improve reproduced sound quality more than conventional sound quality without impairing safety of a vehicle has been demanded.

The present disclosure provides a loudspeaker system that can be mounted on a vehicle, and can improve reproduced sound quality more than conventional sound quality without impairing safety of a vehicle. The present disclosure further provides a loudspeaker system component for such a loudspeaker system, and also provides an audio system including at least one of such a loudspeaker system.

A loudspeaker system according to an aspect of the present disclosure comprising:

a housing including a first housing portion and a second housing portion that are plate-shaped and face each other;

a loudspeaker drive unit fixed to the first housing portion; and a coupling member that is rigid and couples the first housing portion and the second housing portion to each other inside the housing, in which the coupling member includes a first end that is directly or indirectly coupled to the first housing portion and a second end that is directly or indirectly coupled to the second housing portion, and when second force is applied to the coupling member, the second force being smaller than first force that irreversibly deforms or breaks a coupling portion between the coupling member and the first housing portion, the coupling member is irreversibly deformed or broken so as to shorten a distance between the first end and the second end of the coupling member.

A loudspeaker system according to an aspect of the present disclosure includes a coupling member that is irreversibly deformed or broken by external force. This can improve reproduced sound quality more than conventional sound quality without impairing safety of a vehicle, when the loudspeaker system is mounted in the vehicle.

BRIEF DESCRIPTION OF DRAWINGS

FIG. 34 is a schematic diagram illustrating a state when external force is applied to the loudspeaker system in FIG. 32.

DETAILED DESCRIPTION

Hereinafter, exemplary embodiments will be described in detail below with reference to the drawings as appropriate. However, detailed description more than necessary may be omitted. For example, a detailed description of a well-known matter and a duplicated description of substantially the same configuration will be omitted in some cases. This is to avoid unnecessary redundancy in the following description and to facilitate understanding by those skilled in the art.

It is noted that the accompanying drawings and the description below are provided to enable those skilled in the art to fully understand the present disclosure, and are not intended to limit the subject matters described in the claims.

1. First Exemplary Embodiment

Hereinafter, a first exemplary embodiment will be described with reference to FIG. 1 to FIG. 17.

1-1. Schematic Configuration

Figure 1:
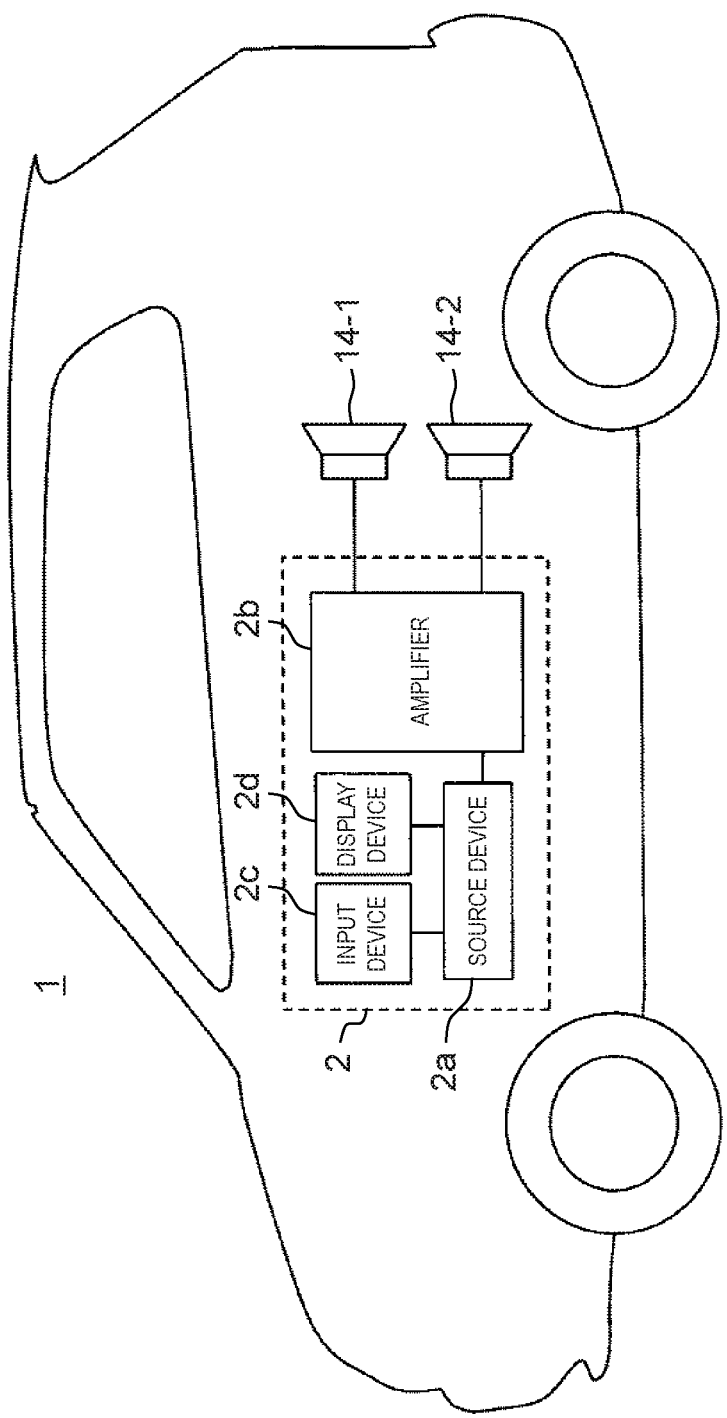
FIG. 1 is a block diagram illustrating a configuration of an automobile in which an audio system according to a first exemplary embodiment is mounted.

FIG. 1 is a block diagram illustrating a configuration of an automobile in which an audio system according to a first exemplary embodiment is mounted. In automobile 1 in FIG. 1, an audio system including audio signal processing device 2 and a plurality of loudspeaker drive units 14-1 and 14-2 that are connected to audio signal processing device 2 is mounted. Audio signal processing device 2 includes source device 2a, amplifier 2b, input device 2c, and display device 2d. Source device 2a includes a sound signal source such as a tuner of radio broadcasting and/or television broadcasting, a player such as a compact disk (CD), a digital video disk (DVD), and/or a Blu-ray disk (BD), and a portable media player. Source device 2a sends a sound signal obtained from the sound signal source to amplifier 2b. Source device 2a operates under control of a user input obtained from input device 2c, and displays its operating state on display device 2d. Amplifier 2b amplifies the sound signal input from source device 2a to output the amplified sound signal to loudspeaker drive units 14-1 and 14-2. Hereinafter, loudspeaker drive units 14-1 and 14-2 are collectively illustrated by attaching a sign "14".

Each loudspeaker drive unit 14 is fixed to a housing, and the loudspeaker drive units and the housings configure the loudspeaker system. Loudspeaker derive unit 14 is fixed to a position tangent to a cabin space of an automobile, for example, a left or right door of automobile 1, and emits sound toward the cabin. Hereinafter, a case where loudspeaker drive unit 14 in FIG. 1 is fixed to the door of automobile 1 to use the door as a housing of the loudspeaker system will be described.

Figure 2:
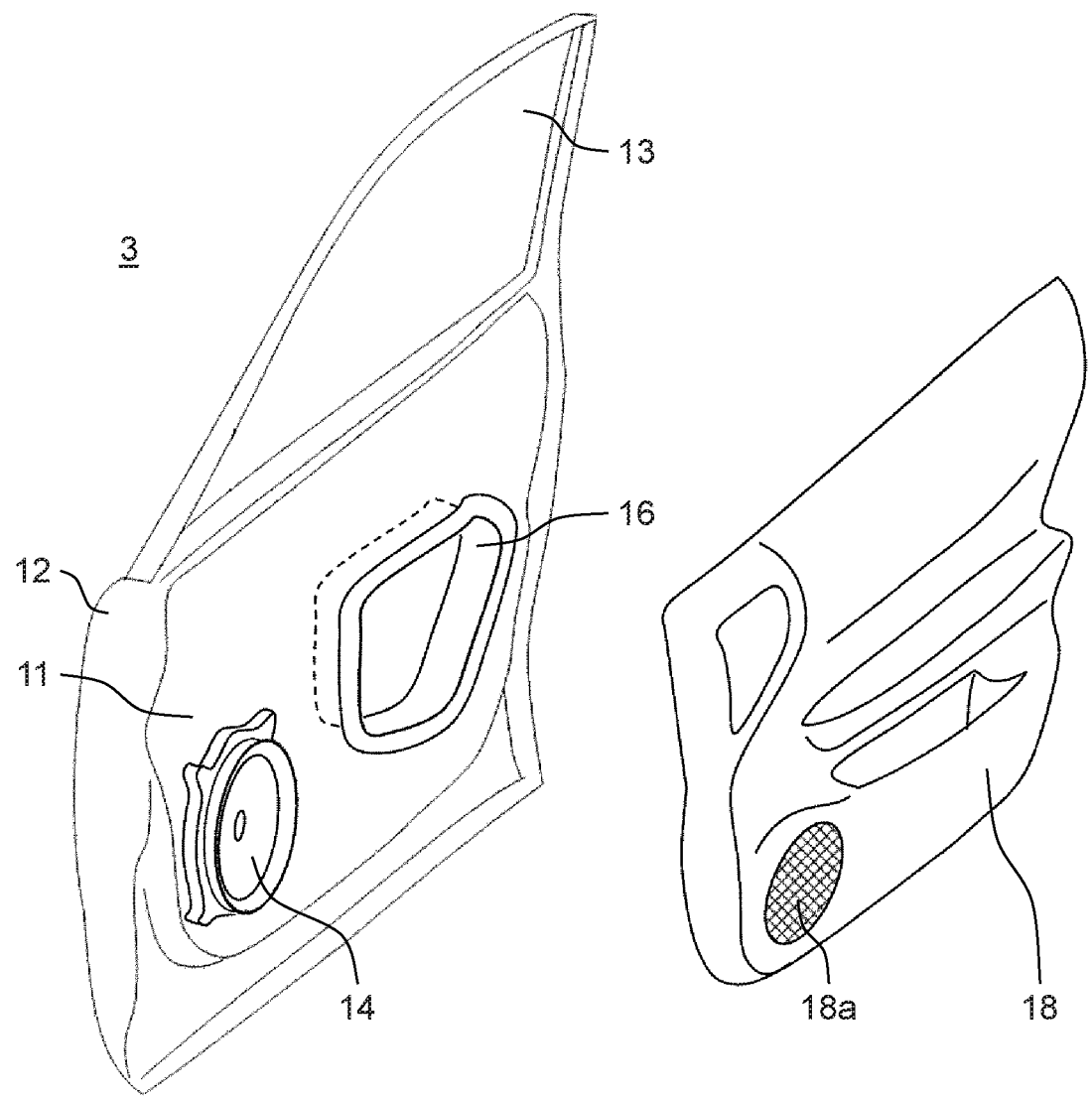
FIG. 2 is a perspective view illustrating a configuration of a door of the automobile in FIG. 1.
Figure 3:
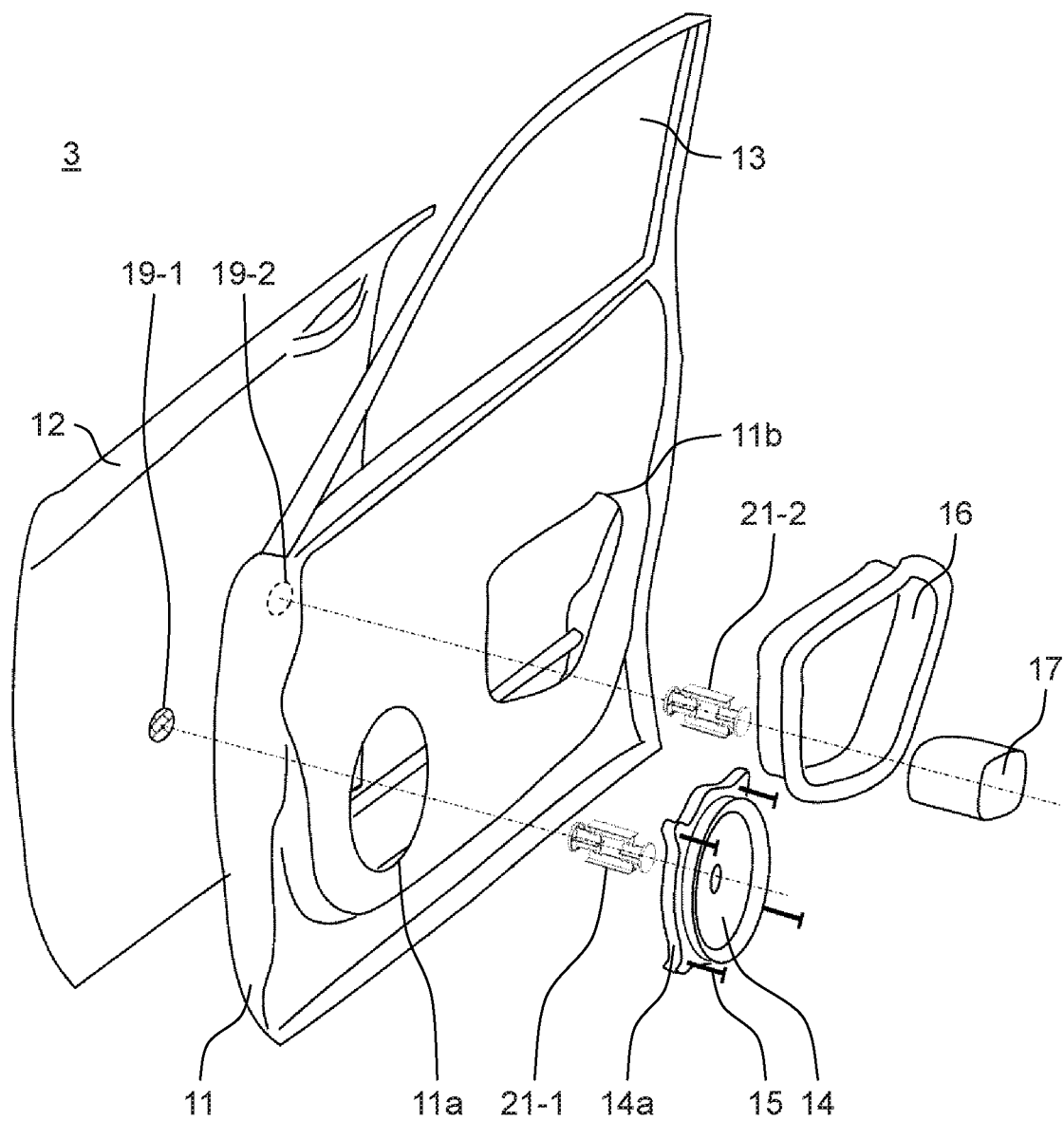
FIG. 3 is an exploded perspective view of a detailed configuration of the door in FIG. 2.

FIG. 2 is a perspective view illustrating a configuration of the door of the automobile in FIG. 1. FIG. 3 is an exploded perspective view of a detailed configuration of the door in FIG. 2. FIG. 2 and FIG. 3 illustrate right door 3 of automobile 1. A right side of each of FIG. 2 and FIG. 3 is a cabin, and a left side of each of FIG. 2 and FIG. 3 is the outside of the automobile. Door 3 in FIG. 2 and FIG. 3 includes inner panel 11, outer panel 12, window glass 13, loudspeaker drive unit 14, fastening member 15, lid member 16, support member 17, interior panel 18, loudspeaker grill 18a, flexible members 19-1 and 19-2, and coupling members 21-1 and 21-2.

As described above, door 3 has a double wall structure including inner panel 11 and outer panel 12 to protect passengers when an accident occurs. Outer panel 12 is disposed to face the outside of the automobile, and inner panel 11 is disposed inward from outer panel 12. Inner panel 11 and outer panel 12 face each other to form a space with a predetermined volume therebetween. Inner panel 11 and outer panel 12 are formed from a plate-shaped metal material, and are fixed to each other by welding. Interior panel 18 for decoration is fixed to inner panel 11 by screws, for example. In the present disclosure, inner panel 11 is also referred to as a "first housing portion", and outer panel 12 is also referred to as a "second housing portion".

Inner panel 11 has at least one of openings 11a and 11b. At a position of opening 11a, loudspeaker drive unit 14 is fixed to inner panel 11 from a side opposite to a side where outer panel 12 is located with respect to inner panel 11. Loudspeaker drive unit 14 is fixed to inner panel 11 by fastening members 15 such as bolts and nuts through screw holes of attachment portions 14a provided at an edge of loudspeaker drive unit 14. In general, door 3 of automobile 1 includes at least one opening 11b (service hole) for manufacturing and maintaining operations, in addition to opening 11a provided for loudspeaker drive unit 14. To prevent unnecessary sound from being emitted from opening 11b, and to prevent rain water from entering the cabin, lid member 16 covers opening 11b. In the present disclosure, lid member 16 is also referred to as a "third housing portion". At a position of opening 11b, lid member 16 is fixed to inner panel 11 from a side opposite to a side where outer panel 12 is located with respect to inner panel 11. In an example in FIG. 2 and FIG. 3, a part of lid member 16 projects into opening 11b so as to form a recess having a predetermined depth when viewed from the cabin (refer to FIG. 17, for example). Support member 17 formed from a flexible material or an elastic material is disposed between lid member 16 and interior panel 18. In interior panel 18, loudspeaker grill 18a is disposed in front of loudspeaker drive unit 14.

For automobile 1, an opening cannot be provided in outer panel 12. Accordingly, coupling members 21-1 and 21-2 are attached from the cabin through the service hole such as opening 11b, and then the lid member closes the service hole.

A hollow structure configured with inner panel 11 and outer panel 12 is used as a housing of the loudspeaker system including loudspeaker drive unit 14. Inner panel 11 functions as a baffle plate for fixing the loudspeaker drive unit. Outer panel 12 functions as a rear plate facing the baffle plate.

The loudspeaker system disposed in door 3 further includes rigid coupling members 21-1 and 21-2 that couple inner panel 11 and outer panel 12 to each other in the housing (i.e., the hollow structure configured with inner panel 11 and outer panel 12). Coupling member 21-1 is coupled to loudspeaker drive unit 14 to be indirectly coupled to inner panel 11. Coupling member 21-2 is coupled to lid member 16 to be indirectly coupled to inner panel 11. Coupling members 21-1 and 21-2 are indirectly coupled to outer panel 12 through flexible members 19-1 and 19-2, respectively. Hereinafter, flexible members 19-1 and 19-2 are collectively illustrated by attaching a sign "19". Coupling members 21-1 and 21-2 are collectively illustrated by attaching a sign "21".

The loudspeaker system may also be attached to a left door of automobile 1 in the same manner as in FIG. 2 and FIG. 3. The loudspeaker system may be disposed to not only the door but also a boundary structure that separates a vehicle inside space and a vehicle outside space of automobile 1 and has a double wall structure including an inner panel and an outer panel.

As described above, when a body of a vehicle such as door 3 of automobile 1 is used as the housing of the loudspeaker system, unnecessary vibration may occur in the body of the vehicle, thereby deteriorating reproduced sound quality. To address this problem, a technique for reinforcing a housing of a loudspeaker system has been known (refer to PTL 2, for example). This technique is used to inhibit the housing from being deformed and to suppress unnecessary vibration of the housing. Coupling member 21 in FIG. 3 is disposed for this purpose.

Next, with reference to FIG. 4 to FIG. 6, some disposition examples of coupling member 21 will be described.

Figure 4:
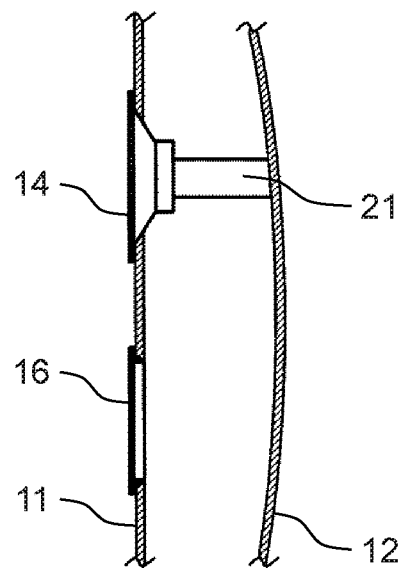
FIG. 4 is a schematic view illustrating a configuration of a first loudspeaker system embedded into the door in FIG. 2.

FIG. 4 is a schematic view illustrating a configuration of a first loudspeaker system embedded into the door in FIG. 2. FIG. 5 is a schematic view illustrating a configuration of a second loudspeaker system embedded into the door in FIG. 2. FIG. 6 is a schematic view illustrating a configuration of a third loudspeaker system embedded into the door in FIG. 2. Coupling member 21 includes a first end (a left end in each of FIG. 4 to FIG. 6) that is directly or indirectly coupled to inner panel 11 and a second end (a right end in each of FIG. 4 to FIG. 6) that is directly or indirectly coupled to outer panel 12. As illustrated in FIG. 4, the first end of coupling member 21 may be coupled to loudspeaker drive unit 14 to be indirectly coupled to inner panel 11. Coupling member 21 and loudspeaker drive unit 14 may integrally be formed. Alternatively, as illustrated in FIG. 5, the first end of coupling member 21 may be coupled to lid member 16 to be indirectly coupled to inner panel 11. Coupling member 21 and lid member 16 may integrally be formed. Alternatively, as illustrated in FIG. 6, the first end of coupling member 21 may be directly coupled to inner panel 11. Coupling member 21 has high rigidity to inhibit the housing of the loudspeaker system from being deformed. The loudspeaker system includes coupling member 21 as illustrated in FIG. 4 to FIG. 6, so that unnecessary vibration of the housing can be suppressed, and generation of unnecessary sound due to the vibration of the housing can be suppressed. This configuration can therefore improve reproduced sound quality more than a case that includes no coupling member 21.

1-2. Schematic Operation

Next, with reference to FIG. 7 to FIG. 9, rigidity of coupling member 21 that is desirable to improve reproduced sound quality will be described.

Figure 7:
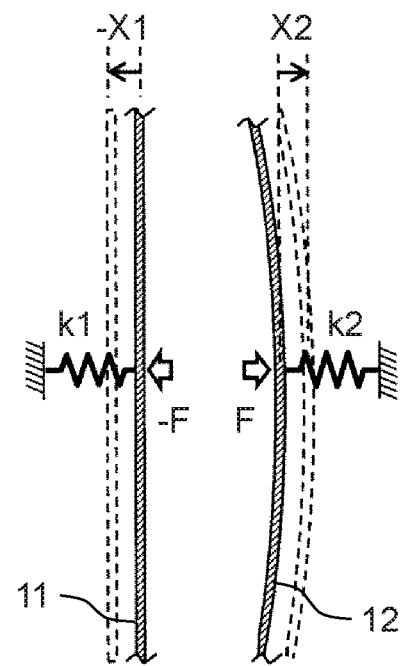
FIG. 7 is a diagram illustrating a model of a loudspeaker system according to a first comparative example.

FIG. 7 is a diagram illustrating a model of a loudspeaker system according to a first comparative example. FIG. 7 illustrates a model of a loudspeaker system excluding coupling member 21. When force −F in a normal direction is applied to inner panel 11, inner panel 11 displaces by displacement amount X1. As k1, a spring constant of inner panel 11 when force −F in the normal direction is applied to inner panel 11 is indicated. When force F in the normal direction is applied to outer panel 12, outer panel 12 displaces by displacement amount X2. As k2, a spring constant of outer panel 12 when force F in the normal direction is applied to outer panel 12 is indicated. Sum X of the displacement amounts of inner panel 11 and outer panel 12 (=X1+X2) is defined as a relative displacement amount of the housing. Herein, relative displacement rigidity K12 of the housing indicating a degree of difficulty in deformation of the housing when coupling member 21 is not coupled to inner panel 11 and outer panel 12 is represented by the following equation.

$$K12 = F/X = k1 \times k2/(k1+k2)$$

Figure 8:
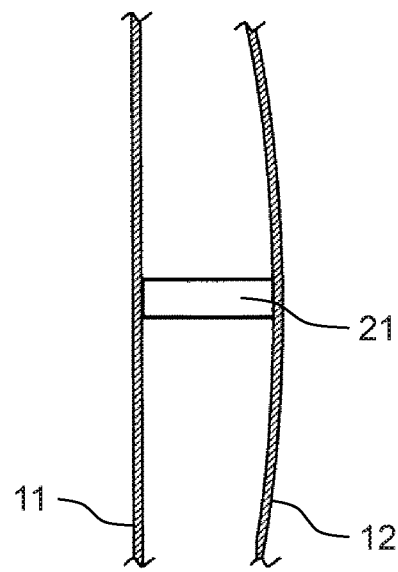
FIG. 8 is a schematic configuration view of a loudspeaker system according to the first exemplary embodiment.
Figure 9:
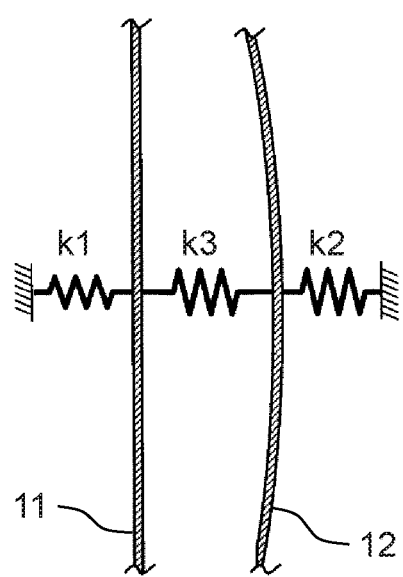
FIG. 9 is a diagram illustrating a model of the loudspeaker system according to the first exemplary embodiment.

FIG. 8 is a schematic configuration view of a loudspeaker system according to the first exemplary embodiment. In FIG. 8, loudspeaker drive unit 14 and lid member 16 are removed from the loudspeaker system in FIG. 6 for simple illustration. FIG. 9 is a diagram illustrating a model of the loudspeaker system according to the first exemplary embodiment. As k1, a spring constant of inner panel 11 when force in the normal direction of inner panel 11 is applied to a coupling portion between coupling member 21 and inner panel 11 is indicated. As k2, a spring constant of outer panel 12 when force in the normal direction of outer panel 12 is applied to a coupling portion between coupling member 21 and outer panel 12 is indicated. As k3, a spring constant of coupling member 21 in a direction along a straight line passing through the first and second ends of coupling member 21 is indicated. In this specification, spring constant k3 is also referred to as "coupling rigidity".

Relative displacement rigidity when coupling member 21 is provided is indicated as K12'. Relative vibration amplitude of inner panel 11 and outer panel 12 when coupling member 21 is provided is decreased to $1/\sqrt{(K12')}$ of relative vibration amplitude when coupling member 21 is not provided. For example, in the direction along the straight line passing through the first and second ends of coupling member 21, coupling member 21 has spring constant k3 larger than at least ½ of relative displacement rigidity K12 when coupling member 21 is not provided. In this case, relative displacement rigidity K12' when coupling member 21 is provided increases to be 1.5 times larger than relative displacement rigidity K12 when coupling member 21 is not provided. Further, in this case, the relative vibration amplitude of inner panel 11 and outer panel 12 decreases by 1.7 dB from that when coupling member 21 is not provided in a low frequency region where a response equivalent to a displacement response to static external force occurs. Preferably, in the direction along the straight line passing through the first and second ends of coupling member 21, coupling member 21 has spring constant k3 larger than relative displacement rigidity K12 when coupling member 21 is not provided. In this case, relative displacement rigidity K12' when coupling member 21 is provided increases to twice larger than relative displacement rigidity K12 when coupling member 21 is not provided. Further, in this case, the relative vibration amplitude of inner panel 11 and outer panel 12 decreases by 3 dB from that when coupling member 21 is not provided in the low frequency region where the response equivalent to the displacement response to static external force occurs. In this manner, with higher rigidity of coupling member 21, acoustic performance of the loudspeaker system is improved more.

Even with coupling member 21 made of any material and having any shape, rigidity (spring constant) of the housing can be improved, as long as coupling member 21 is present between inner panel 11 and outer panel 12. However, to improve reproduced sound quality, coupling member 21 having spring constant k3 larger than at least ½ of relative displacement rigidity K12 when coupling member 21 is not provided may be used, as described above.

Next, with reference to FIG. 10 to FIG. 12, further requirements of coupling member 21 will be described.

Figure 10:
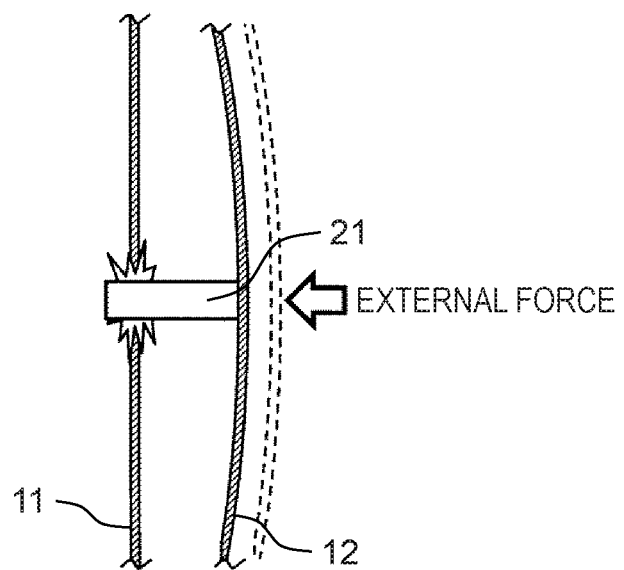
FIG. 10 is a diagram illustrating a state when external force is applied to a loudspeaker system according to a second comparative example.

FIG. 10 is a diagram illustrating a state when external force is applied to a loudspeaker system according to a second comparative example. When coupling member 21 has a structure whose rigidity is high and that is hardly broken, external force applied to outer panel 12 is transmitted to inner panel 11 through coupling member 21. In this case, coupling member 21 (or inner panel 11 itself) may project into the cabin. Similarly, when the loudspeaker system has the configuration in FIG. 4, loudspeaker drive unit 14 may project into the cabin. When the loudspeaker system has the configuration in FIG. 5, lid member 16 may project into the cabin. In this manner, with the loudspeaker system including coupling member 21, when external force is applied to door 3 of automobile 1, a structure may project into the cabin, and the structure may be brought into contact with passengers in automobile 1. Accordingly, it is required that even when coupling member 21 is provided to improve reproduced sound quality, safety of automobile 1 is not impaired.

Figure 11:
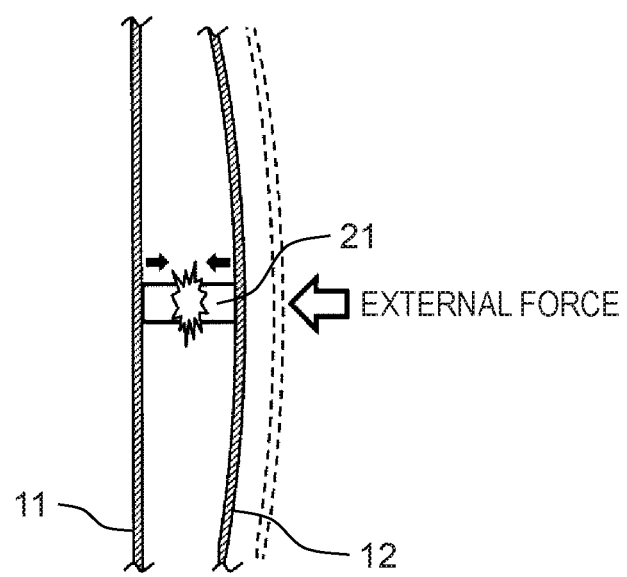
FIG. 11 is a diagram illustrating a state when external force is applied to the loudspeaker system according to the first exemplary embodiment.

FIG. 11 is a diagram illustrating a state when external force is applied to the loudspeaker system according to the first exemplary embodiment. To secure safety, when external force is applied to outer panel 12, coupling member 21 needs to be broken before a coupling portion between coupling member 21 and inner panel 11 is broken. Herein, when coupling member 21 is indirectly coupled to inner panel 11 as illustrated in FIG. 4, the coupling portion between coupling member 21 and inner panel 11 includes a coupling portion between coupling member 21 and loudspeaker drive unit 14 and a coupling portion between loudspeaker drive unit 14 and inner panel 11. Similarly, when coupling member 21 is indirectly coupled to inner panel 11 as illustrated in FIG. 5, the coupling portion between coupling member 21 and inner panel 11 includes a coupling portion between coupling member 21 and lid member 16 and a coupling portion between lid member 16 and inner panel 11. When second force is applied to coupling member 21, the second force being smaller than first force that irreversibly deforms or breaks the coupling portion between coupling member 21 and inner panel 11, coupling member 21 is configured to irreversibly deform or break so as to shorten a distance between the first and second ends of coupling member 21.

When force is applied to a predetermined position of a member, amplitude of limit force that causes irreversible deformation or breakdown in the member is referred to as "breaking strength". Further, in this specification, amplitude of limit force that causes breakdown at an attachment portion of a member attached to a housing of a loudspeaker system on a member side or a housing side is referred to as "attachment strength". In this manner, coupling member 21 has such a feature that coupling member 21 has breaking strength smaller than attachment strength of loudspeaker drive unit 14 or lid member 16, or has breaking strength smaller than breaking strength of inner panel 11.

Figure 5:
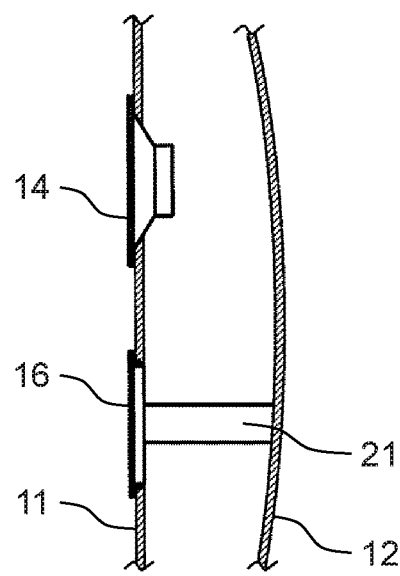
FIG. 5 is a schematic view illustrating a configuration of a second loudspeaker system embedded into the door in FIG. 2.
Figure 6:
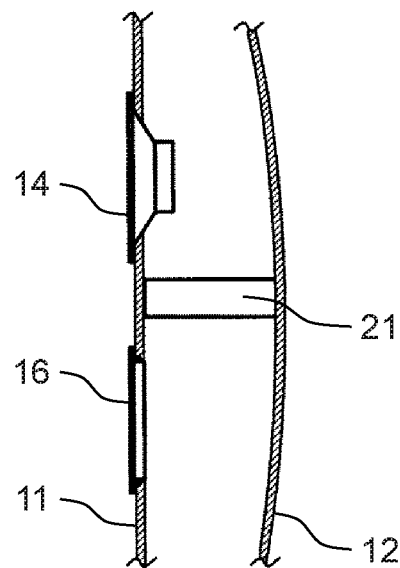
FIG. 6 is a schematic view illustrating a configuration of a third loudspeaker system embedded into the door in FIG. 2.
Figure 12:
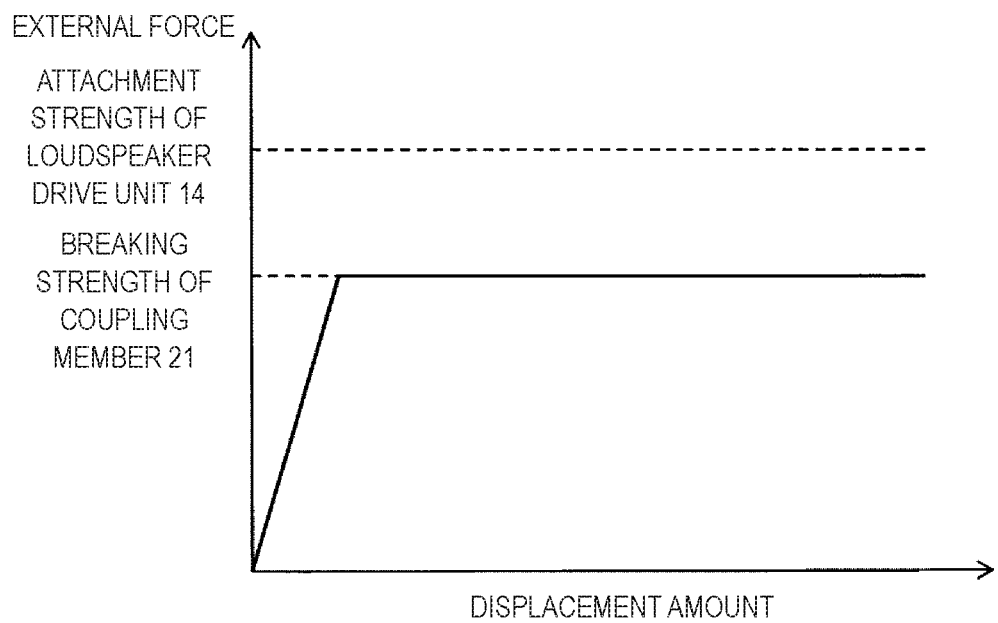
FIG. 12 is a graph schematically illustrating a relationship between external force and a displacement amount with respect to coupling members in FIG. 4 to FIG. 6.

FIG. 12 is a graph schematically illustrating a relationship between external force and a displacement amount with respect to the coupling members in FIG. 4 to FIG. 6. As described above, the breaking strength of coupling member 21 is set to be smaller than the attachment strength of loudspeaker drive unit 14. The displacement amount in a horizontal axis indicates magnitude of displacement in the direction along the straight line passing through the first and second ends of coupling member 21. In the direction along the straight line passing through the first and second ends of coupling member 21, when external force smaller than the breaking strength of coupling member 21 is applied to coupling member 21, coupling member 21 is configured so as not to displace largely. The higher rigidity of coupling member 21 is, that is, the steeper an inclination of the graph is, the more acoustic performance of the loudspeaker system is improved. On the other hand, when external force applied to coupling member 21 reaches the breaking strength of coupling member 21, coupling member 21 is broken, and thus, even when external force is applied to outer panel 12, this force is not transmitted to loudspeaker drive unit 14 and inner panel 11. Coupling member 21 having the characteristic in FIG. 12 can achieve both acoustic performance and safety.

1-3. First Example

Next, a loudspeaker system according to a first example of the first exemplary embodiment will be described with reference to FIG. 13 to FIG. 16B.

1-3-1. Configuration of First Example

Figure 13:
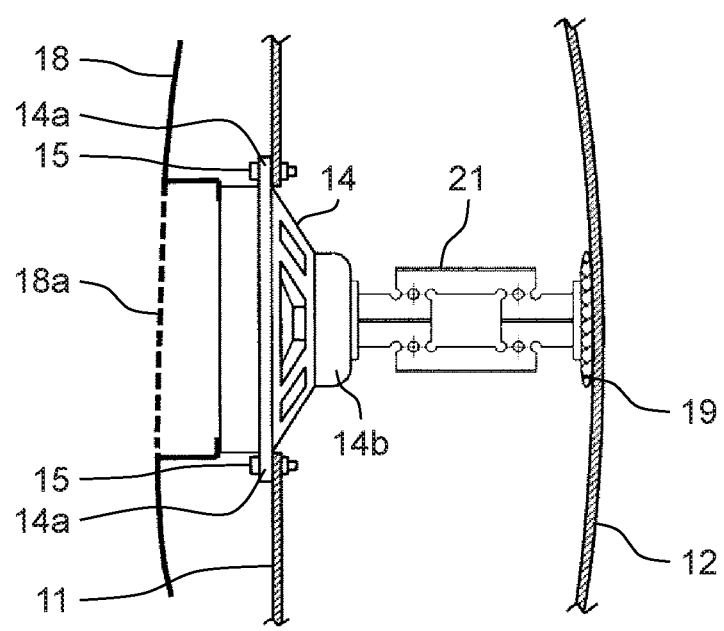
FIG. 13 is a sectional view illustrating a configuration of a loudspeaker system according to a first example of the first exemplary embodiment.

FIG. 13 is a sectional view illustrating a configuration of the loudspeaker system according to the first example of the first exemplary embodiment. The loudspeaker system in FIG. 13 is an example of the loudspeaker system in FIG. 4.

As described with reference to FIG. 1 to FIG. 3, the loudspeaker system in FIG. 13 is disposed in door 3 tangent to the cabin space of automobile 1.

The loudspeaker system in FIG. 13 includes inner panel 11, outer panel 12, loudspeaker drive unit 14, fastening members 15, interior panel 18, loudspeaker grill 18a, flexible member 19, and coupling member 21. As described above, outer panel 12 is disposed to face the outside of automobile 1, and inner panel 11 is disposed inward from outer panel 12. Interior panel 18 is disposed to face the cabin space inside inner panel 11. Loudspeaker drive unit 14 is fixed to inner panel 11. Coupling member 21 is coupled to loudspeaker drive unit 14 to be indirectly coupled to inner panel 11, thereby coupling inner panel 11 and outer panel 12 to each other. A shape and a thickness of each of inner panel 11 and outer panel 12 are adjusted such that relative displacement rigidity at a position to which coupling member 21 is coupled has a desired value.

Loudspeaker drive unit 14 has attachment portions 14a each having a 11b shape and projecting from a periphery of a cylindrical frame of loudspeaker drive unit 14. Each attachment portion 14a has a screw hole (not illustrated). Loudspeaker drive unit 14 is fixed to inner panel 11 by fastening members 15 including bolts and nuts. The nut of fastening member 15 is embedded in inner panel 11. The bolt of fastening member 15 is inserted and fixed to the nut of fastening member 15 through the screw hole of attachment portion 14a of loudspeaker drive unit 14 from the cabin. A shape and a thickness of each 11b in each attachment portion 14a of loudspeaker drive unit 14 are adjusted such that when external force is applied from outer panel 12, loudspeaker drive unit 14 has desired attachment strength. The frame of loudspeaker drive unit 14 and an exterior portion of magnet 14b of loudspeaker drive unit 14 are formed from a resin material to reduce their weight and to protect magnet 14b when rainwater enters. Loudspeaker drive unit 14 emits sound toward the cabin through loudspeaker grill 18a disposed in interior panel 18.

In an example in FIG. 13, coupling member 21 is coupled in the vicinity of members (e.g., the magnet and a yoke) configuring a magnetic circuit of loudspeaker drive unit 14. In this case, reaction force to diaphragm driving force transmitted from the coupling portion between coupling member 21 and loudspeaker drive unit 14 to inner panel 11 (baffle plate) is transmitted at the same phase to outer panel 12 through coupling member 21. This can suppress occurrence of resonance with a mode in which the housing is expanded. Further, weight of members directly coupled to the members of the magnetic circuit is increased, so that amplitude of vibration due to the reaction force to the diaphragm driving force can be suppressed.

Figure 14B:
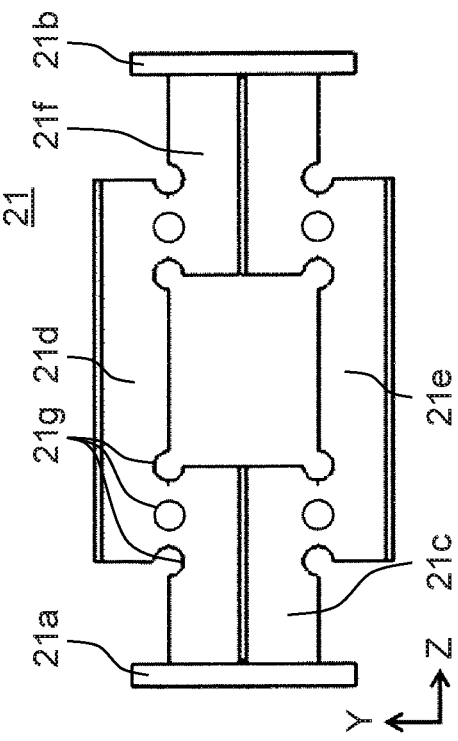
FIG. 14B is a diagram illustrating the detailed configuration of the coupling member of the loudspeaker system in FIG. 13, which is a side view of the coupling member.
Figure 14D:
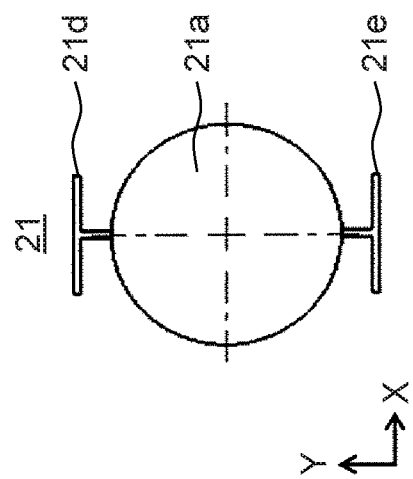
FIG. 14D is a diagram illustrating the detailed configuration of the coupling member of the loudspeaker system in FIG. 13, which is a front view of the coupling member.
Figure 14A:
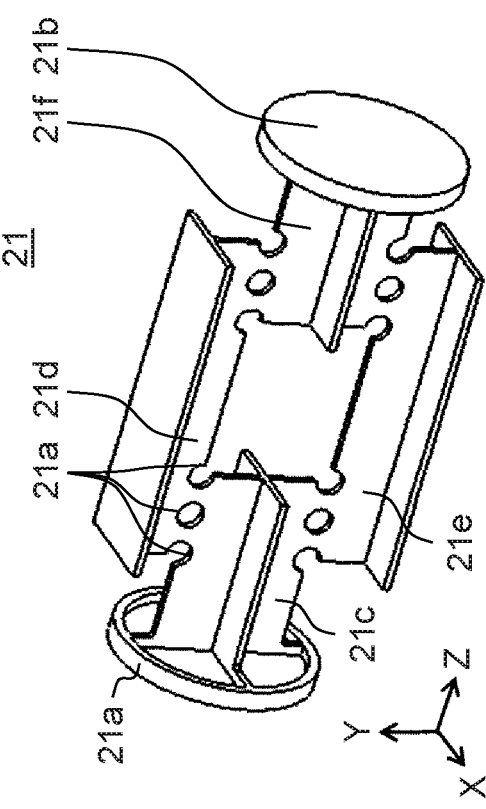
FIG. 14A is a diagram illustrating a detailed configuration of a coupling member of the loudspeaker system in FIG. 13, which is a perspective view of the coupling member.
Figure 14C:
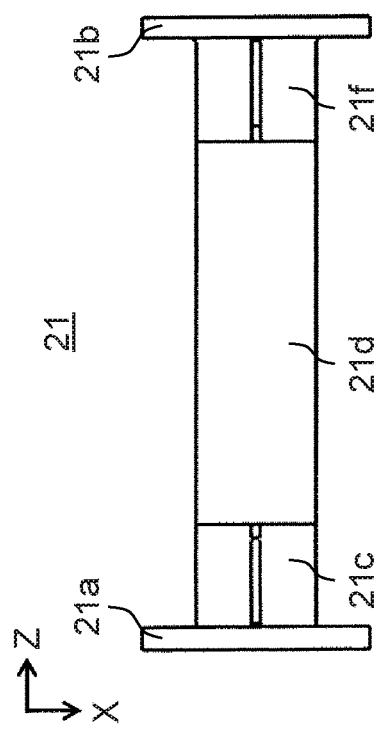
FIG. 14C is a diagram illustrating the detailed configuration of the coupling member of the loudspeaker system in FIG. 13, which is a top view of the coupling member.

FIG. 14A to FIG. 14D each illustrate a detailed configuration of the coupling member of the loudspeaker system in FIG. 13. FIG. 14A is a perspective view of the coupling member. FIG. 14B is a side view of the coupling member. FIG. 14C is a top view of the coupling member. FIG. 14D is a front view of the coupling member. Coupling member 21 in FIG. 14A includes ends 21a and 21b, and a plurality of portions 21c to 21f coupled to one another between ends 21a and 21b. A longitudinal portion of the plurality of portions 21c to 21f of coupling member 21 extends parallel to a straight line (e.g., a straight line parallel to a Z axis in FIG. 14A to FIG. 14D) passing through ends 21a and 21b of coupling member 21.

In this specification, the "straight line passing through ends 21a and 21b of coupling member 21" indicates a straight line passing through any point in end 21a of coupling member 21 and any point in end 21b of coupling member 21. This straight line may pass through a center of a region where end 21a of coupling member 21 is brought into contact with inner panel 11 and a center of a region where end 21b of coupling member 21 is brought into contact with outer panel 12, for example. Alternatively, this straight line may pass through a point other than the center in at least one of those regions. This straight line may orthogonally intersect at least one of inner panel 11 and outer panel 12, or may intersect at least one of inner panel 11 and outer panel 12 at a predetermined angle larger than 0 degrees and smaller than 90 degrees. In this manner, the longitudinal portion of the plurality of portions 21c to 21f of coupling member 21 extends parallel to the straight line passing through ends 21a and 21b of coupling member 21.

A part of a certain portion of the plurality of portions 21c to 21f of coupling member 21 in the longitudinal portion is coupled to a part of another portion of the plurality of portions of coupling member 21 in the longitudinal portion. In an example in FIG. 14B, a predetermined section near a right end of portion 21c of coupling member 21 is coupled to predetermined sections near left ends of portions 21d and 21e of coupling member 21. Similarly, predetermined sections near right ends of portion 21d and 21e of coupling member 21 is coupled to a predetermined section near a left end of portion 21f of coupling member 21.

At least one cutout or hole is formed at positions where the plurality of portions 21c to 21f of coupling member 21 are coupled to one another. In an example in FIG. 14A, a plurality of holes 21g disposed at the positions where the plurality of portions 21c to 21f of coupling member 21 are coupled to one another are formed at predetermined intervals.

Each hole 21g is formed in a curved shape, for example, in an arc shape. Breaking strength of coupling member 21 varies depending on a minute radius of curvature of a tip of the cutout or hole. When the tip has an acute angle, stress concentration theoretically becomes infinity. When each hole 21g is formed into a smooth shape, the breaking strength (stress value) of coupling member 21 is made stable.

The plurality of portions 21c to 21f of coupling member 21 are configured with thin plates and libs, for example. In the example in FIG. 14A, the plurality of portions 21c to 21f of coupling member 21 include thin plates parallel to a Y-Z plane and libs parallel to an X-Z plane. Each of portions 21c and 21f of coupling member 21 is formed as a beam having a cross-shaped sectional shape. Each of portions 21d and 21e of coupling member 21 is formed as a beam having a T-shaped sectional shape. In this manner, the beam-structured portion configured with the plurality of portions 21c to 21f of coupling member 21 is made to be a three-dimensional structure with the thin plates and the libs. This hinders buckling distortion of the beam-structured portion, and a buckling load of a beam portion is made larger than breaking strength, so that a fluctuation in internal stress of coupling member 21 due to occurrence of the buckling distortion can be suppressed. The breaking strength (stress value) of coupling member 21 is therefore stabilized.

Portions 21c and 21f of coupling member 21 are coupled to ends 21a and 21b of coupling member 21, respectively. Portions 21c and 21f of coupling member 21 are coupled to each other through portions 21d and 21e of coupling member 21. To shorten a distance between ends 21a and 21b of coupling member 21 when force larger than the breaking strength of coupling member 21 is applied to coupling member 21, a vacant space is provided between portions 21c and 21f of coupling member 21 (a center portion of coupling member 21 in the longitudinal direction). Shapes and thicknesses of the libs in the plurality of portions 21c to 21f of coupling member 21, a shape of each hole 21g, and other factors are adjusted such that the breaking strength and coupling rigidity of coupling member 21 become desired values.

Coupling member 21 having the configuration in FIG. 14A to FIG. 14D can achieve breaking strength smaller than attachment strength of loudspeaker drive unit 14.

[1-3-2. Operation of First Example]

Figure 15A:
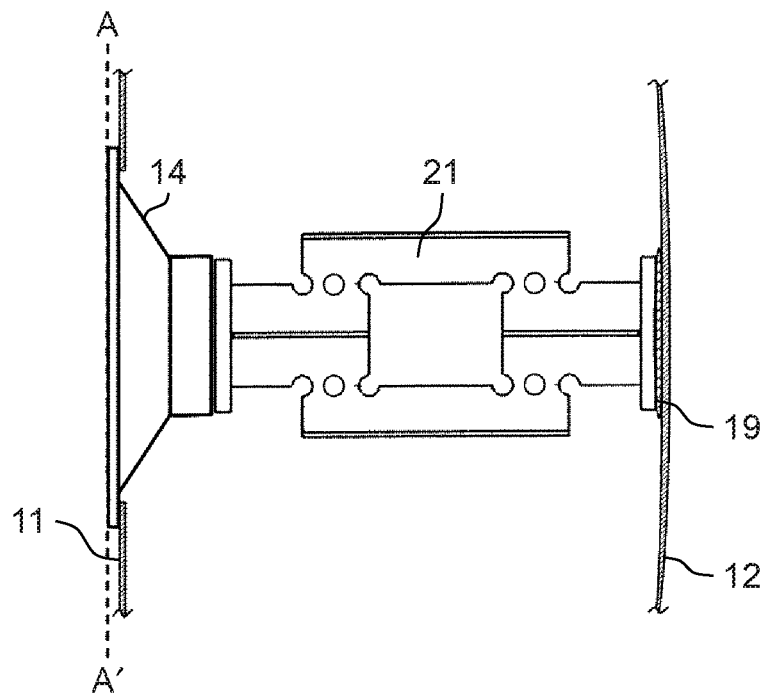
FIG. 15A is a schematic diagram illustrating a state when external force is not applied to the loudspeaker system in FIG. 13.
Figure 15B:
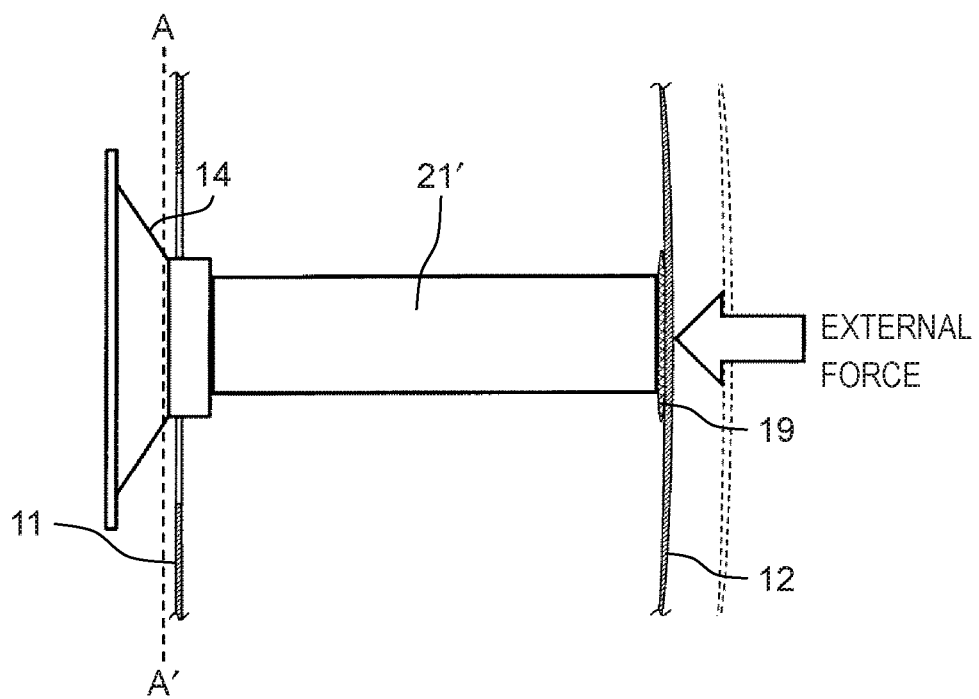
FIG. 15B is a schematic diagram illustrating release of a loudspeaker drive unit when external force is applied to the loudspeaker system in the third comparative example.

FIG. 15A is a schematic diagram illustrating a state when external force is not applied to the loudspeaker system in FIG. 13. FIG. 15B is a schematic diagram illustrating release of a loudspeaker drive unit when external force is applied to the loudspeaker system in a third comparative example. FIG. 15B illustrates a case of a loudspeaker system including coupling member 21' having breaking strength larger than the attachment strength of loudspeaker drive unit 14, instead of coupling member 21 in FIG. 13. To secure safety of automobile 1, loudspeaker drive unit 14 is required not to project into a left side of line A-A' in each of FIG. 15A and FIG. 15B (i.e., into the cabin). However, in a case in FIG. 15B, when external force is applied to outer panel 12, loudspeaker drive unit 14 possibly protrudes into the left side of line A-A'.

Figure 16A:
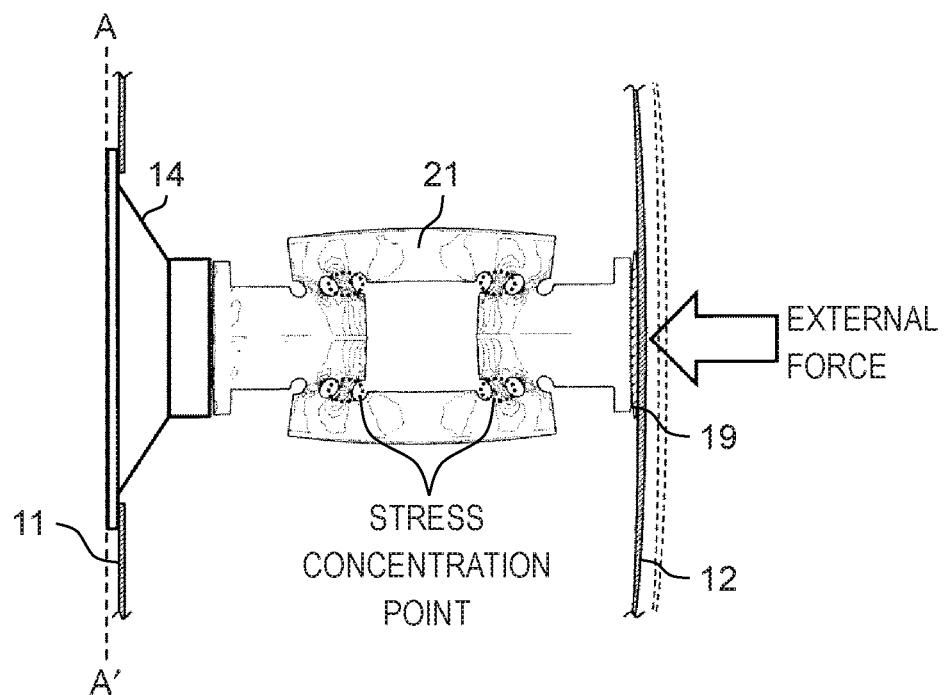
FIG. 16A is a schematic diagram illustrating a state when external force is applied to the loudspeaker system in FIG. 13.
Figure 16B:
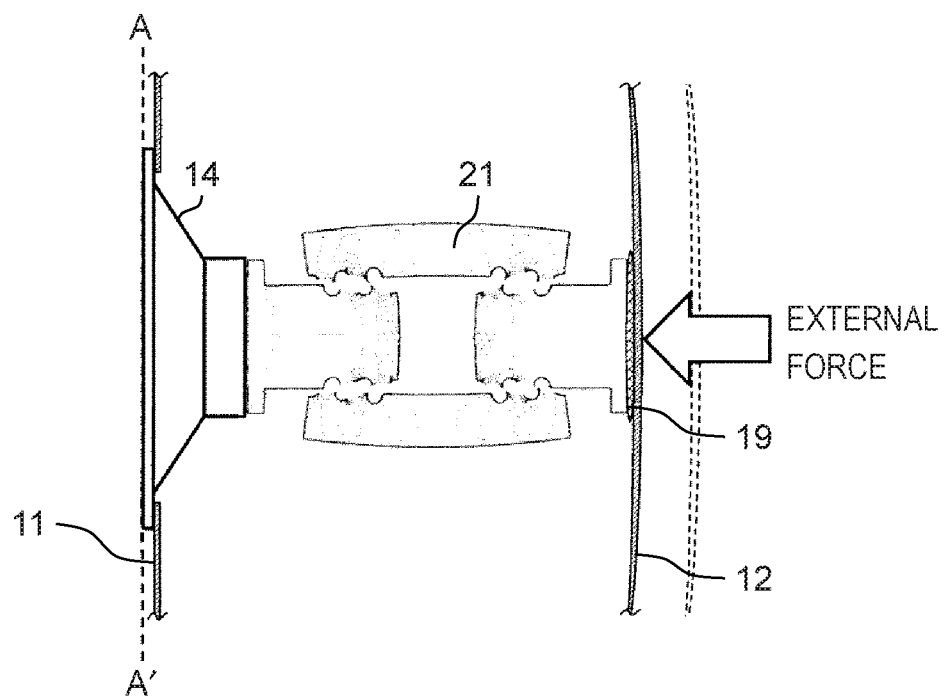
FIG. 16B is a schematic diagram illustrating a state when external force larger than that in FIG. 16A is applied to the loudspeaker system in FIG. 13.

FIG. 16A is a schematic diagram illustrating a state when external force is applied to the loudspeaker system in FIG. 13. FIG. 16B is a schematic diagram illustrating a state when external force larger than that in FIG. 16B is applied to the loudspeaker system in FIG. 13. Each of FIG. 16A and FIG. 16B illustrates a case in which the breaking strength of coupling member 21 is smaller than the attachment strength of loudspeaker drive unit 14. In this case, when external force is applied to outer panel 12, stress concentrates at points where the plurality of portions of coupling member 21 are coupled to one another (i.e., portions formed with the holes) as illustrated in FIG. 16A. When still larger external force is applied to outer panel 12, coupling member 21 is broken from the points where stress concentrates as illustrated in FIG. 16B. Accordingly, in a case in FIG. 16B, even when external force is applied to outer panel 12, coupling member 21 is broken, so that loudspeaker drive unit 14 does not protrude into the left side of line A-A'.

The loudspeaker system in FIG. 13 includes coupling member 21 that is irreversibly deformed or broken by external force. This can improve reproduced sound quality more than conventional sound quality without impairing safety of a vehicle.

1-4. Second Example

Next, a loudspeaker system according to a second example of the first exemplary embodiment will be described with reference to FIG. 17.

[1-4-1. Configuration of Second Example]

Figure 17:
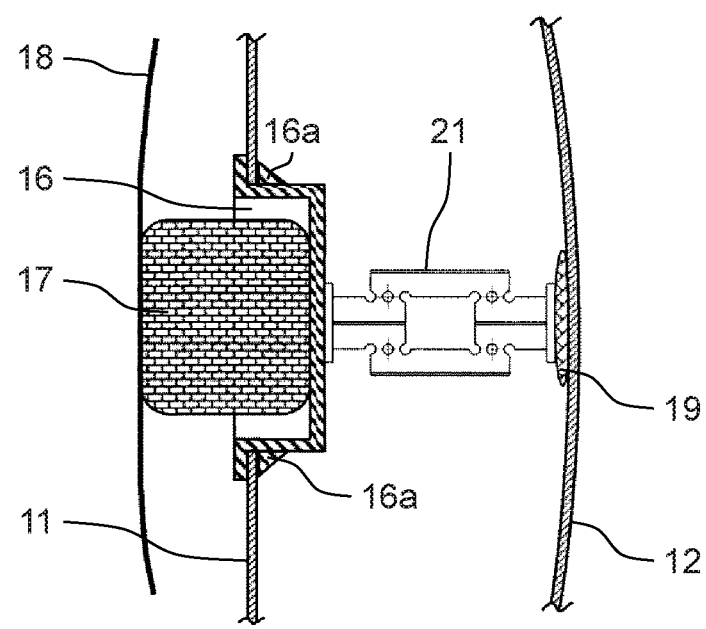
FIG. 17 is a sectional view illustrating a configuration of a loudspeaker system according to a second example of the first exemplary embodiment.

FIG. 17 is a sectional view illustrating a configuration of the loudspeaker system according to the second example of the first exemplary embodiment. The loudspeaker system in FIG. 17 is an example of the loudspeaker system in FIG. 5. As described with reference to FIG. 1 to FIG. 3, the loudspeaker system in FIG. 17 is disposed in door 3 tangent to the cabin space of automobile 1.

The loudspeaker system in FIG. 17 includes inner panel 11, outer panel 12, lid member 16, support member 17, interior panel 18, flexible member 19, and coupling member 21.

Lid member 16 is fixed to inner panel 11 at a position of the service hole (opening 11b in FIG. 3) of inner panel 11. Coupling member 21 is coupled to lid member 16 to be indirectly coupled to inner panel 11, thereby coupling inner panel 11 and outer panel 12 to each other. Support member 17 is disposed between lid member 16 and interior panel 18.

Lid member 16 includes a flange facing the cabin, and a bottom formed to be a recess having a predetermined depth when viewed from the cabin (in other words, to project toward outer panel 12 from the flange). The bottom of lid member 16 is formed to follow a shape of the service hole. When the bottom of lid member 16 is incorporated in the service hole, the flange positions lid member 16, and airtightness is maintained. Claws 16a are provided on a side surface of the bottom of lid member 16 for return prevention. When claws 16a of lid member 16 engage with an edge of the service hole of inner panel 11, an attachment portion of lid member 16 is formed, thereby fixing lid member 16 to inner panel 11. A shape and a thickness of each claw 16a in the attachment portion of lid member 16 are adjusted such that when external force from outer panel 12 is applied to the lid member 16, lid member 16 has desired attachment strength.

The loudspeaker system in FIG. 17 is configured similarly to the loudspeaker system in FIG. 13 besides provision of lid member 16 and support member 17 instead of loudspeaker drive unit 14 and loudspeaker grill 18a in FIG. 13.

Coupling member 21 of the loudspeaker system in FIG. 17 having the configuration in FIG. 14A to FIG. 14D can achieve breaking strength smaller than attachment strength of lid member 16.

[1-4-2. Operation of Second Example]

To secure safety of automobile 1, lid member 16 is required not to project into the cabin. In a case where the breaking strength of coupling member 21 is smaller than the attachment strength of lid member 16, when external force is applied to outer panel 12, stress concentrates at the points where the plurality of portions of coupling member 21 are coupled to one another (i.e., the points formed with the holes), similarly to the case in FIG. 16A. When still larger external force is applied to outer panel 12, coupling member 21 is broken from the points where stress concentrates, similarly to the case in FIG. 16B. Accordingly, in the case of FIG. 16B, even when external force is applied to outer panel 12, coupling member 21 is broken, so that lid member 16 does not project into the cabin.

The loudspeaker system in FIG. 17 includes coupling member 21 that is irreversibly deformed or broken by external force. This can improve reproduced sound quality more than conventional sound quality without impairing safety of a vehicle.

1-6. Effects and Others

A loudspeaker system, a loudspeaker system component, and an audio system according to an aspect of the present disclosure include the following configurations.

A loudspeaker system according to an aspect of the present disclosure includes a housing including inner panel 11 and outer panel 12 that are plate-shaped and face each other, loudspeaker drive unit 14 fixed to inner panel 11, and coupling member 21 that is rigid and couples inner panel 11 and outer panel 12 to each other inside the housing. Coupling member 21 includes a first end that is directly or indirectly coupled to inner panel 11 and a second end that is directly or indirectly coupled to outer panel 12. When second force is applied to coupling member 21, the second force being smaller than first force that irreversibly deforms or breaks a coupling portion between coupling member 21 and inner panel 11, coupling member 21 is irreversibly deformed or broken so as to shorten a distance between the first and second ends of coupling member 21.

This configuration includes coupling member 21 that is irreversibly deformed or broken by external force. This can improve reproduced sound quality more than conventional sound quality without impairing safety of a vehicle. Since coupling member 21 is broken before the coupling portion between coupling member 21 and inner panel 11 is broken, coupling member 21 does not project into a cabin, so that safety can be secured.

In a loudspeaker system according to an aspect of the present disclosure, coupling member 21 may be configured with a plurality of portions 21c to 21f coupled to one another. In this case, at least one cutout or hole 21g is formed at positions where the plurality of portions 21c to 21f of coupling member 21 are coupled to one another.

With this configuration, coupling member 21 includes the cutout or hole, so that a position of coupling member 21 that is broken first is stabilized.

In a loudspeaker system according to an aspect of the present disclosure, at least one cutout or hole 21g may be formed into a curved shape.

With this configuration, a position where stress concentrates in the cutout or the hole is configured with a curved line or a curved surface, thereby stabilizing breaking strength (stress value).

In a loudspeaker system according to an aspect of the present disclosure, a plurality of holes 21g disposed at predetermined intervals may be formed at the positions where the plurality of portions 21c to 21f of coupling member 21 are coupled to one another.

With this configuration, breakdown occurs along the plurality of holes 21g, thereby stabilizing a place where coupling member 21 is broken and breaking strength of coupling member 21.

In a loudspeaker system according to an aspect of the present disclosure, a plurality of positions 21c to 21f of coupling member 21 may include a longitudinal portion extending parallel to a straight line passing through a first and second ends of coupling member 21. In this case, a part of a certain portion of the plurality of portions 21c to 21f of coupling member 21 in the longitudinal portion is coupled to another portion of the plurality of portions 21c to 21f of coupling member 21 in the longitudinal portion.

This can reliably break the coupling member.

In a loudspeaker system according to an aspect of the present disclosure, coupling member 21 may be configured with a thin plate and a 11b.

With this configuration, lightweight coupling member 21 can easily be manufactured.

In a loudspeaker system according to an aspect of the present disclosure, a first end of coupling member 21 may be coupled to loudspeaker drive unit 14 to be indirectly coupled to inner panel 11.

With this configuration, breaking strength of coupling member 21 is made smaller than attachment strength of loudspeaker drive unit 14. Therefore, when external force is applied to coupling member 21, coupling member 21 is broken before a coupling portion between loudspeaker drive unit 14 and inner panel 11 is broken. With this configuration, loudspeaker drive unit 14 does not project into a cabin, thereby securing safety.

In a loudspeaker system according to an aspect of the present disclosure, coupling member 21 and loudspeaker drive unit 14 may integrally be formed.

With this configuration, parts count and assembly manhour of the loudspeaker system can be reduced, and accordingly cost can be decreased.

In a loudspeaker system according to an aspect of the present disclosure, inner panel 11 may include at least one opening 11a. In this case, at a position of opening 11a of inner panel 11, loudspeaker drive unit 14 is fixed to inner panel 11 from a side opposite to a side where outer panel 12 is located with respect to inner panel 11.

With this configuration, loudspeaker drive unit 14 can be attached from a cabin of automobile 1, thereby facilitating assembly of the loudspeaker system.

In a loudspeaker system according to an aspect of the present disclosure, a housing may include lid member 16 fixed to inner panel 11. In this case, a first end of coupling member 21 is coupled to lid member 16 to be indirectly coupled to inner panel 11.

With this configuration, breaking strength of coupling member 21 is made smaller than attachment strength of lid member 16. Therefore, when external force is applied to coupling member 21, coupling member 21 is broken before a coupling portion between lid member 16 and inner panel 11 is broken. With this configuration, lid member 16 does not project into a cabin, so that safety can be secured.

In a loudspeaker system according to an aspect of the present disclosure, coupling member 21 and lid member 16 may integrally be formed.

With this configuration, parts count and assembly manhour of the loudspeaker system can be reduced, and accordingly cost can be decreased.

In a loudspeaker system according to an aspect of the present disclosure, inner panel 11 may include at least one opening 11b. In this case, at a position of opening 11b of inner panel 11, lid member 16 is fixed to inner panel 11 from a side opposite to a side where outer panel 12 is located with respect to inner panel 11.

With this configuration, lid member 16 can be attached from the cabin of automobile 1, thereby facilitating work upon assembling the loudspeaker system.

In a loudspeaker system according to an aspect of the present disclosure, a first end of coupling member 21 may be directly coupled to inner panel 11.

Since coupling member 21 is thus broken before a coupling portion between coupling member 21 and inner panel 11 is broken, coupling member 21 does not project into the cabin, so that safety can be secured.

In a loudspeaker system according to an aspect of the present disclosure, a second end of coupling member 21 may be indirectly coupled to outer panel 12 via flexible member 19.

With this configuration, since coupling member 21 is coupled to the outer panel via flexible member 19, coupling member 21 can be easily attached to outer panel 12 even when accuracy in shape of outer panel 12 is poor.

In a loudspeaker system according to an aspect of the present disclosure, when a spring constant of inner panel 11 when force in a normal direction of inner panel 11 is applied to a coupling portion between coupling member 21 and inner panel 11 is defined as k1, a spring constant of outer panel 12 when force in a normal direction of outer panel 12 is applied to a coupling portion between coupling member 21 and outer panel 12 is defined as k2, and relative displacement rigidity of a housing indicating a degree of difficulty in deformation of the housing when coupling member 21 is not coupled to inner panel 11 and outer panel 12 is represented by K12=k1×k2/(k1+k2), coupling member 21 may have a spring constant larger than at least ½ of the relative displacement rigidity in a direction along a straight line passing through a first and second ends of coupling member 21.

With this configuration, coupling member 21 thus provided can reduce amplitude of unnecessary vibration. For example, when coupling rigidity of coupling member 21 is the same level as coupling rigidity when coupling member 21 is not provided, amplitude of unnecessary vibration is reduced by half in comparison with a case when coupling member 21 is not provided.

In a loudspeaker system according to an aspect of the present disclosure, the loudspeaker system may be mounted on a vehicle. In this case, inner panel 11 is disposed inward from outer panel 12 in a body of the vehicle.

With this configuration, the loudspeaker system disposed in the vehicle such as automobile 1 can improve reproduced sound quality more than conventional sound quality without impairing safety of the vehicle.

In a loudspeaker system according to an aspect of the present disclosure, a housing may be disposed in door 3 in vehicle 1.

With this configuration, the loudspeaker system disposed in the vehicle such as automobile 1 can improve reproduced sound quality more than conventional sound quality without impairing safety of the vehicle.

In an audio system according to an aspect of the present disclosure, the loudspeaker system described above and audio signal processing device 2 connected to the loudspeaker system are included.

With this configuration, the audio system disposed in the vehicle such as automobile 1 can improve reproduced sound quality more than conventional sound quality without impairing safety of the vehicle.

In a loudspeaker system component according to an aspect of the present disclosure, the loudspeaker system component for a loudspeaker system including a housing including inner panel 11 and outer panel 12 that are plate-shaped and face each other, and loudspeaker drive unit 14 fixed to inner panel 11 is provided. The loudspeaker system component includes coupling member 21 that is rigid and couples inner panel 11 and outer panel 12 to each other inside the housing. Coupling member 21 includes a first end that is directly or indirectly coupled to inner panel 11 and a second end that is directly or indirectly coupled to outer panel 12. When second force is applied to coupling member 21, the second force being smaller than first force that irreversibly deforms or breaks a coupling portion between coupling member 21 and inner panel 11, coupling member 21 is irreversibly deformed or broken so as to shorten a distance between the first and second ends of coupling member 21.

This configuration includes coupling member 21 that is irreversibly deformed or broken by external force. This can improve reproduced sound quality more than conventional sound quality without impairing safety of a vehicle.

In a loudspeaker system component according to an aspect of the present disclosure, a first end of coupling member 21 may be coupled to loudspeaker drive unit 14 to be indirectly coupled to inner panel 11.

With this configuration, breaking strength of coupling member 21 is made smaller than attachment strength of loudspeaker drive unit 14. Therefore, when external force is applied to coupling member 21, coupling member 21 is broken before a coupling portion between loudspeaker drive unit 14 and inner panel 11 is broken. With this configuration, loudspeaker drive unit 14 does not project into a cabin, so that safety can be secured.

In a loudspeaker system component according to an aspect of the present disclosure, the loudspeaker system component may further include loudspeaker drive unit 14. In this case, coupling member 21 and loudspeaker drive unit 14 are integrally formed.

With this configuration, parts count and assembly manhour of the loudspeaker system can be reduced, and accordingly cost can be decreased.

2. Second Exemplary Embodiment

Hereinafter, a second exemplary embodiment will be described with reference to FIG. 18 to FIG. 23.

2-1. Configuration

Figure 18:
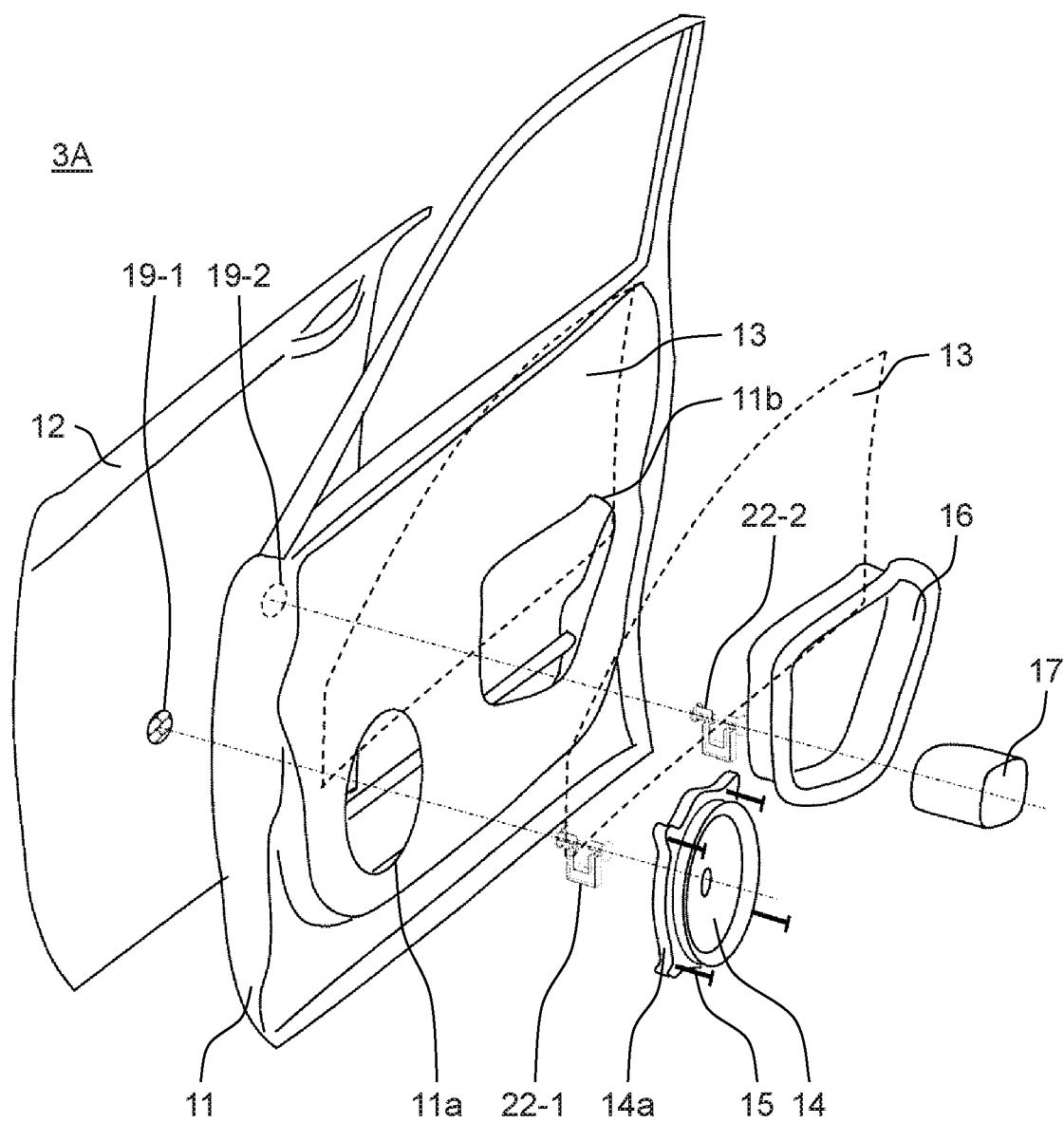
FIG. 18 is an exploded perspective view illustrating a detailed configuration of a door of an automobile in which a loudspeaker system according to a second exemplary embodiment is mounted.

FIG. 18 is an exploded perspective view illustrating a detailed configuration of a door of an automobile in which a loudspeaker system according to the second exemplary embodiment is mounted. Depending on a position of a coupling member disposed in the door of the automobile, window glass embedded in the door of the automobile may collide with the coupling member when the window glass descends. Door 3A in FIG. 18 includes coupling members 22-1 and 22-2 configured to avoid collision with window glass 13, instead of coupling members 21-1 and 21-2 of door 3 in FIG. 2 and FIG. 3. Hereinafter, coupling members 22-1 and 22-2 are collectively illustrated by attaching a sign "22". Door 3A in FIG. 18 is configured similarly to door 3 in FIG. 2 and FIG. 3 besides coupling member 22.

[2-2-1. Configuration of First Example]

Figure 19:
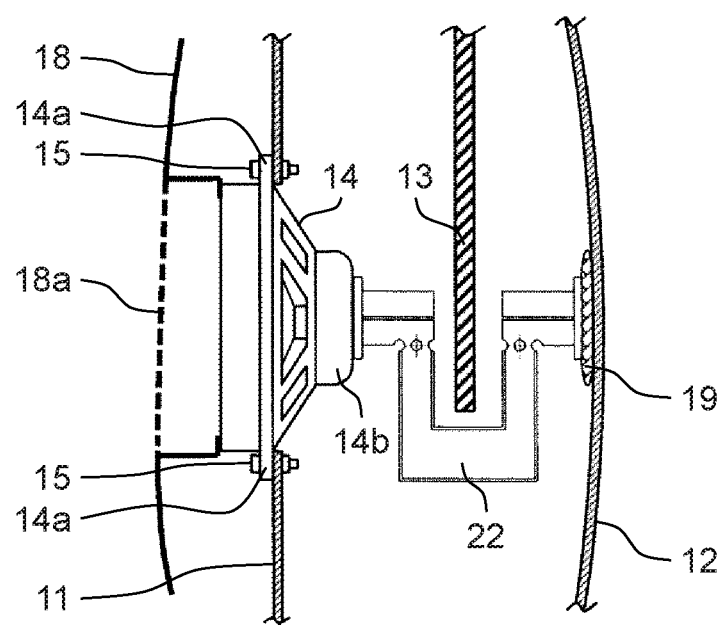
FIG. 19 is a sectional view illustrating a configuration of a loudspeaker system according to a first example of the second exemplary embodiment.

FIG. 19 is a sectional view illustrating a configuration of a loudspeaker system according to a first example of the second exemplary embodiment. The loudspeaker system in FIG. 19 is configured similarly to the loudspeaker system in FIG. 13 besides provision of coupling member 22 instead of coupling member 21 in FIG. 13.

Figure 20B:
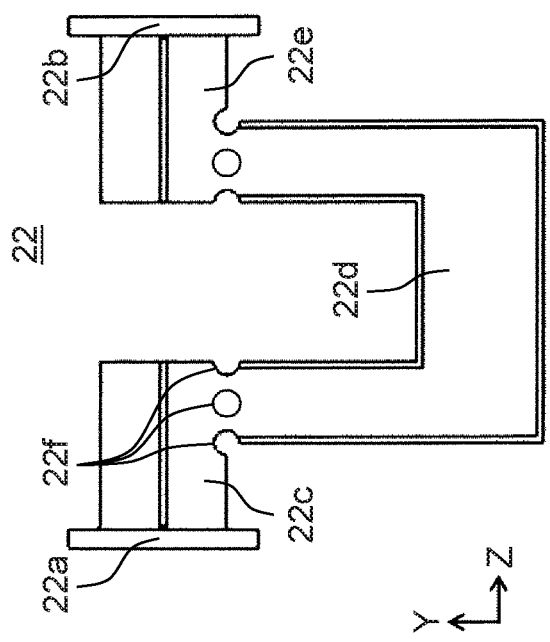
FIG. 20B is a diagram illustrating the detailed configuration of the coupling member of the loudspeaker system in FIG. 19, which is a side view of the coupling member.
Figure 20D:
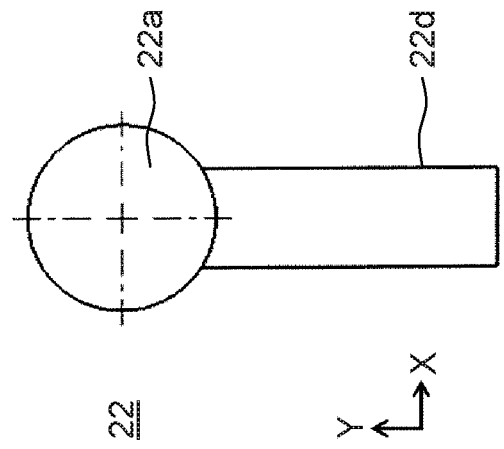
FIG. 20D is a diagram illustrating the detailed configuration of the coupling member of the loudspeaker system in FIG. 19, which is a front view of the coupling member.
Figure 20A:
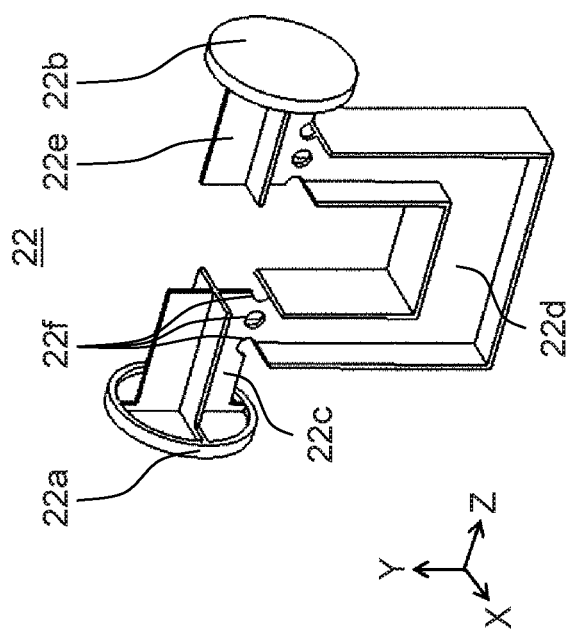
FIG. 20A is a diagram illustrating a detailed configuration of a coupling member of the loudspeaker system in FIG. 19, which is a perspective view of the coupling member.
Figure 20C:
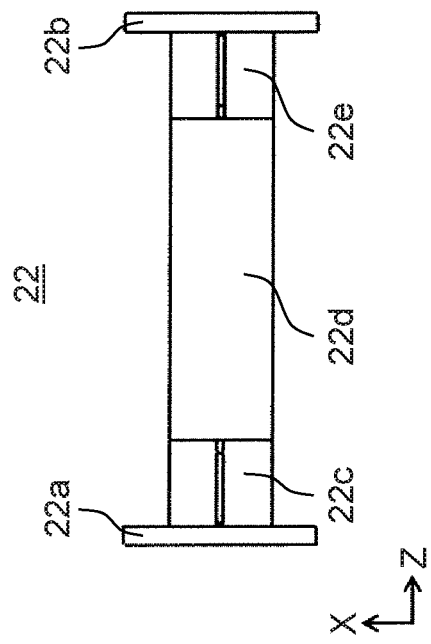
FIG. 20C is a diagram illustrating the detailed configuration of the coupling member of the loudspeaker system in FIG. 19, which is a bottom view of the coupling member.

FIG. 20A to FIG. 20D each illustrate a detailed configuration of a coupling member of the loudspeaker system in FIG. 19. FIG. 20A is a perspective view of the coupling member. FIG. 20B is a side view of the coupling member. FIG. 20C is a bottom view of the coupling member. FIG. 20D is a front view of the coupling member. Coupling member 22 in FIG. 20A to FIG. 20D includes ends 22a and 22b, and a plurality of portions 22c to 22e coupled to one another between ends 22a and 22b. Coupling member 22 is bent such that another component can intersect a line segment connecting ends 22a and 22b of coupling member 22, and is formed into a U shape, for example.

In this specification, the "line segment connecting ends 22a and 22b of coupling member 22" indicates a line segment that connects any point in end 22a of coupling member 22 and any point in end 22b of coupling member 22 to each other. This line segment may connect a center of a region where end 22a of coupling member 22 is brought into contact with inner panel 11 and a center of a region where end 22b of coupling member 22 is brought into contact with outer panel 12 to each other, for example. Alternatively, this line segment may be connected to a point other than the center in at least one of those regions. This straight line may orthogonally intersect at least one of inner panel 11 and outer panel 12, or may intersect at least one of inner panel 11 and outer panel 12 at a predetermined angle larger than 0 degrees and smaller than 90 degrees.

A plurality of holes 22f disposed at predetermined intervals are formed at the positions where the plurality of portions 22c to 22e of coupling member 22 are coupled to one another. Each hole 22f is formed in a curved shape, for example, in an arc shape.

The plurality of portions 22c to 22e of coupling member 22 are configured with thin plates and libs, for example. In the example in FIG. 20A, the plurality of portions 22c to 22e of coupling member 22 include thin plates parallel to a Y-Z plane and libs orthogonal to the Y-Z plane. Each of portions 22c and 22e of coupling member 22 is formed as a beam having a cross-shaped sectional shape. Portion 22d of coupling member 22 is formed as a beam having an H-shaped section. Portion 22d of coupling member 22 is formed into a U shape as a whole. A shape and dimensions of portion 22d of coupling member 22 are adjusted such that coupling member 22 does not touch a lowermost end of window glass 13 when window glass 13 descends and is incorporated in door 3A. Portions 22c and 22e of coupling member 22 are coupled to ends 22a and 22b of coupling member 22, respectively. Portions 22c and 22e of coupling member 22 are coupled to each other through portion 22d of coupling member 22. To shorten a distance between ends 22a and 22b of coupling member 22 when force larger than the breaking strength of coupling member 22 is applied to coupling member 22, a vacant space is provided between portions 22c and 22e of coupling member 22. Shapes and thicknesses of the libs in the plurality of portions 22c to 22e of coupling member 22, a shape of each hole 22f, and other factors are adjusted such that the breaking strength and coupling rigidity of coupling member 22 become desired values.

Coupling member 22 having the configuration in FIG. 20A to FIG. 20D can achieve breaking strength smaller than attachment strength of loudspeaker drive unit 14.

[2-2-2. Operation of First Example]

Figure 21A:
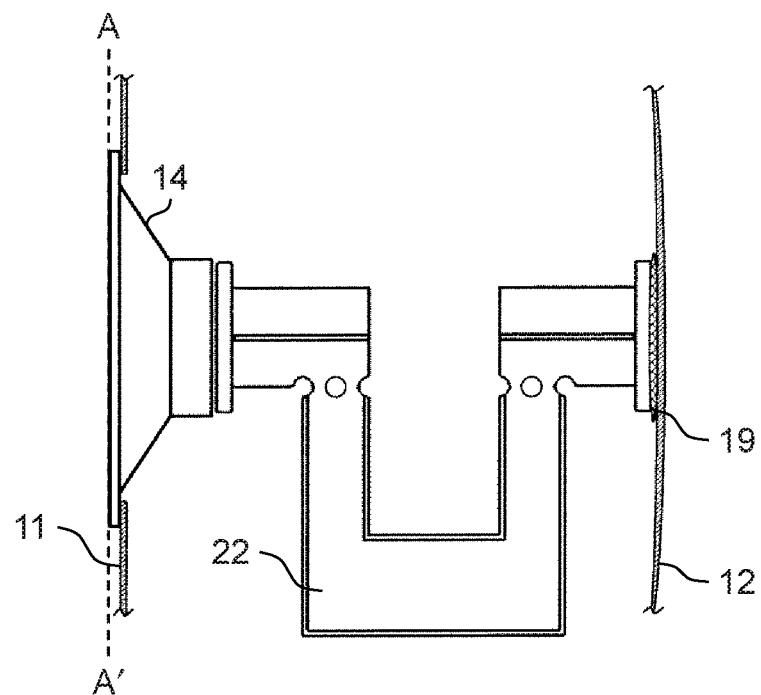
FIG. 21A is a schematic diagram illustrating a state when external force is not applied to the loudspeaker system in FIG. 19.
Figure 21B:
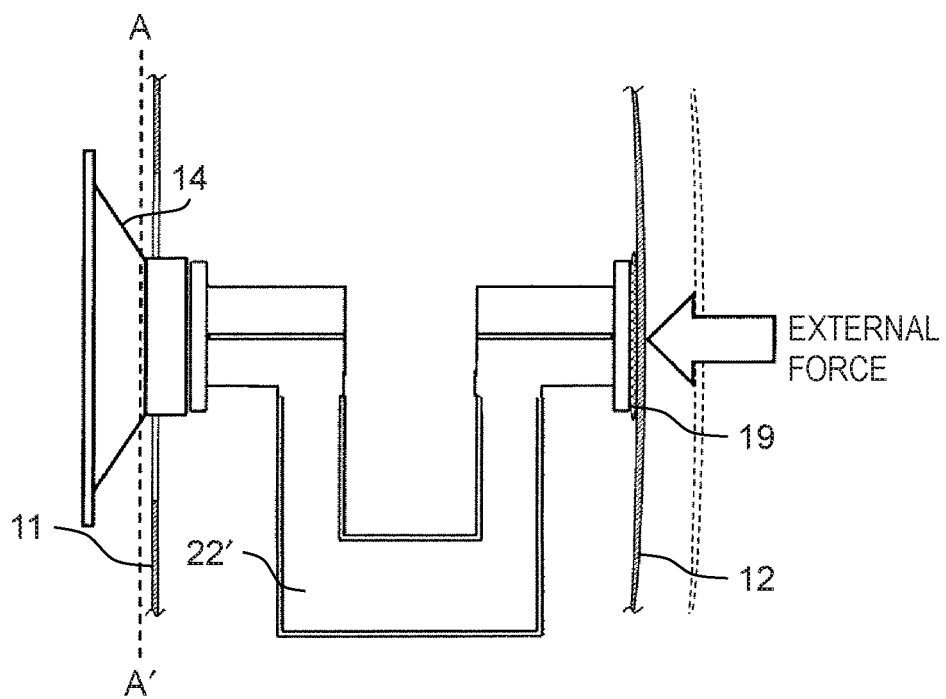
FIG. 21B is a schematic diagram illustrating release of a loudspeaker drive unit when external force is applied to the loudspeaker system in the third comparative example.

FIG. 21A is a schematic diagram illustrating a state when external force is not applied to the loudspeaker system in FIG. 19. FIG. 21B is a schematic diagram illustrating release of a loudspeaker drive unit when external force is applied to the loudspeaker system in a third comparative example. FIG. 21B illustrates a case of a loudspeaker system including coupling member 22' having breaking strength larger than the attachment strength of loudspeaker drive unit 14, instead of coupling member 22 in FIG. 19. To secure safety of automobile 1, loudspeaker drive unit 14 is required not to project into a left side of line A-A' in each of FIG. 21A and FIG. 21B (i.e., into a cabin). However, in a case in FIG. 21B, when external force is applied to outer panel 12, loudspeaker drive unit 14 possibly protrudes into the left side of line A-A'.

Figure 22A:
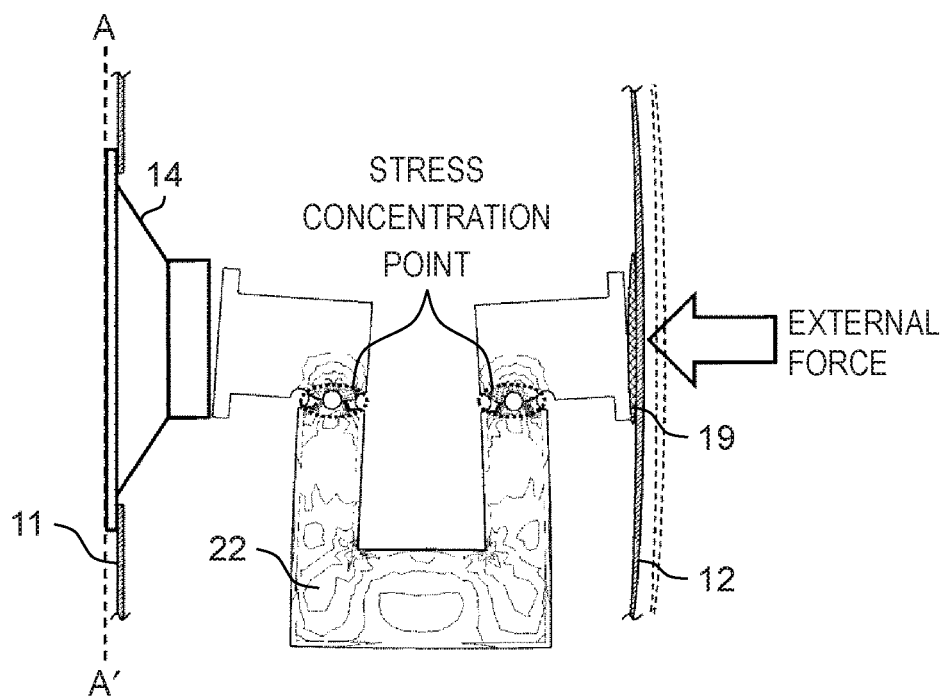
FIG. 22A is a schematic diagram illustrating a state when external force is applied to the loudspeaker system in FIG. 19.
Figure 22B:
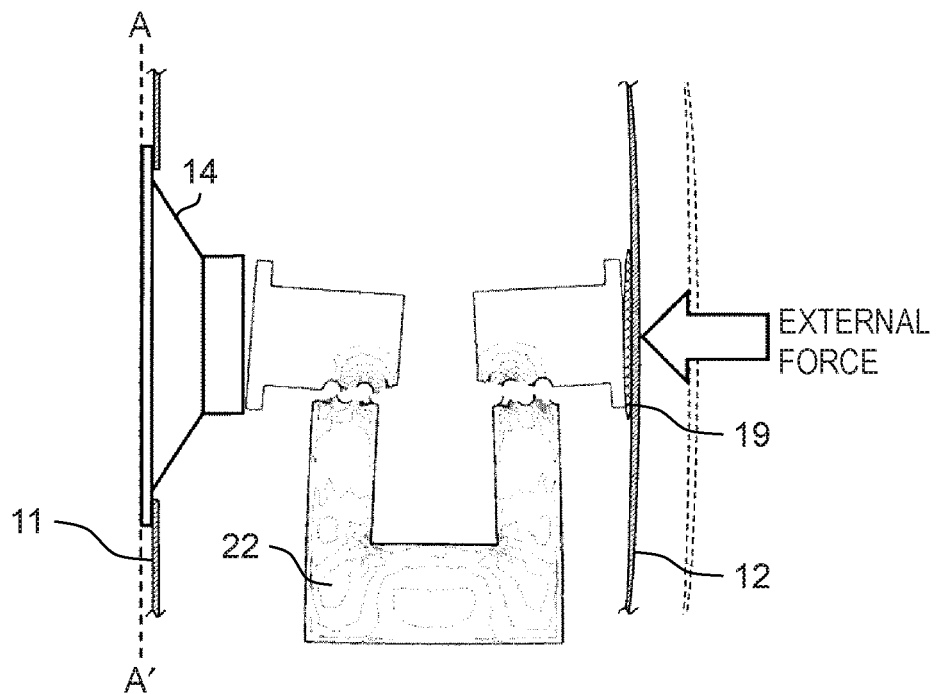
FIG. 22B is a schematic diagram illustrating a state when external force larger than that in FIG. 22A is applied to the loudspeaker system in FIG. 19.

FIG. 22A is a schematic diagram illustrating a state when external force is applied to the loudspeaker system in FIG. 19. FIG. 22B is a schematic diagram illustrating a state when external force larger than that in FIG. 22A is applied to the loudspeaker system in FIG. 19. FIG. 22A and FIG. 22B illustrate a case where the breaking strength of coupling member 22 is smaller than the attachment strength of loudspeaker drive unit 14. In this case, when external force is applied to outer panel 12, stress concentrates at points where the plurality of portions of coupling member 22 are coupled to one another (i.e., portions formed with the holes), as illustrated in FIG. 22A. When still larger external force is applied to outer panel 12, coupling member 22 is broken from the points where stress concentrates, as illustrated in FIG. 22B. Accordingly, in a case in FIG. 22B, even when external force is applied to outer panel 12, coupling member 22 is broken, so that loudspeaker drive unit 14 does not protrude into the left side of line A-A'.

The loudspeaker system in FIG. 19 includes coupling member 22 that is irreversibly deformed or broken by external force. This can improve reproduced sound quality more than conventional sound quality without impairing safety of a vehicle.

[2-3-1. Configuration of Second Example]

Figure 23:
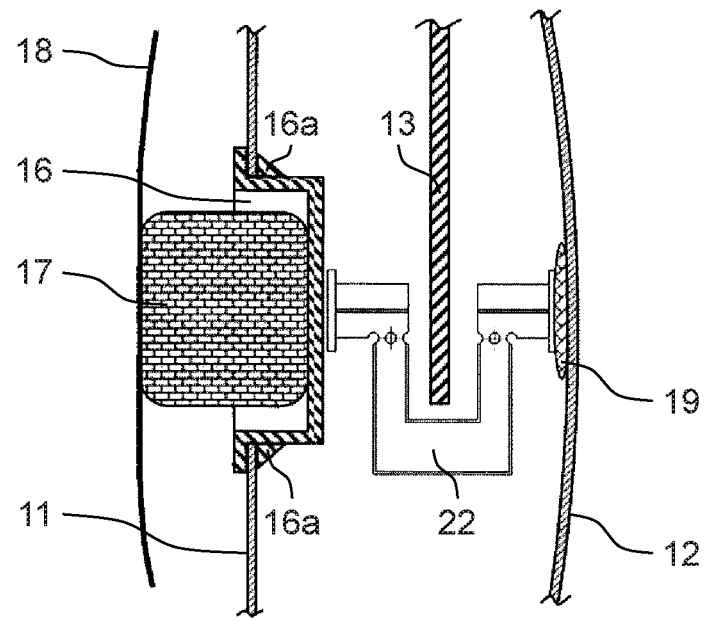
FIG. 23 is a sectional view illustrating a configuration of a loudspeaker system according to a second example of the second exemplary embodiment.

FIG. 23 is a sectional view illustrating a configuration of a loudspeaker system according to a second example of the second exemplary embodiment. The loudspeaker system in FIG. 23 is configured similarly to the loudspeaker system in FIG. 17 besides provision of coupling member 22 instead of coupling member 21 in FIG. 17.

Coupling member 22 of the loudspeaker system in FIG. 23 having the configuration in FIG. 20A to FIG. 20D can achieve breaking strength smaller than attachment strength of lid member 16.

[2-3-2. Operation of Second Example]

To secure safety of automobile 1, lid member 16 is required not to project into the cabin. In a case where the breaking strength of coupling member 22 is smaller than the attachment strength of lid member 16, when external force is applied to outer panel 12, stress concentrates at the points where the plurality of portions of coupling member 22 are coupled to one another (i.e., the points formed with the holes), similarly to the case in FIG. 22A. When still larger external force is applied to outer panel 12, coupling member 22 is broken from the points where stress concentrates, similarly to the case in FIG. 22B. Accordingly, in the case of FIG. 23, even when external force is applied to outer panel 12, coupling member 22 is broken, so that lid member 16 does not project into the cabin.

The loudspeaker system in FIG. 23 includes coupling member 22 that is irreversibly deformed or broken by external force. This can improve reproduced sound quality more than conventional sound quality without impairing safety of a vehicle.

2-4. Effects and Others

In a loudspeaker system according to an aspect of the present disclosure, coupling member 22 is formed such that coupling member 22 is bent to allow another component to intersect a line segment connecting first and second ends of coupling member 22.

With this configuration, when window grass 13 descends, window grass 13 can be prevented from colliding with coupling member 22.

3. Third Exemplary Embodiment

Hereinafter, a third exemplary embodiment will be described with reference to FIG. 24 to FIG. 27.

[3-2-1. Configuration of First Example]

Figure 24:
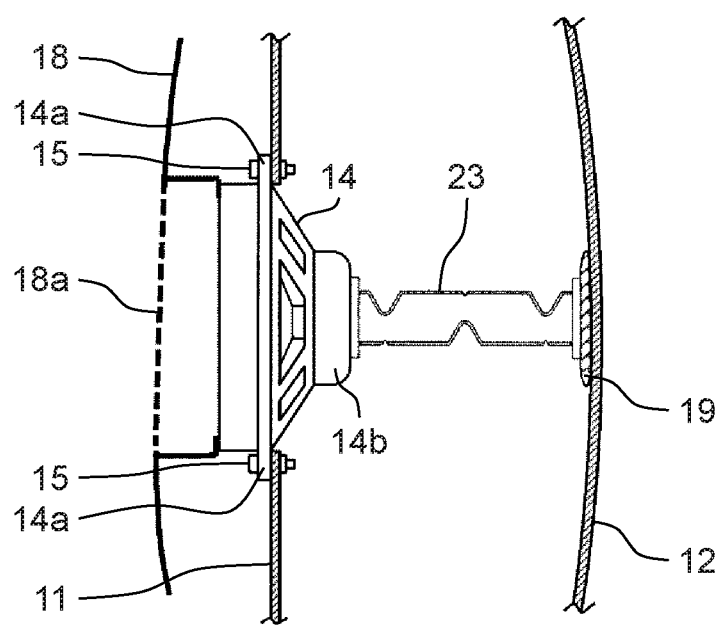
FIG. 24 is a sectional view illustrating a configuration of a loudspeaker system according to a first example of a third exemplary embodiment.

FIG. 24 is a sectional view illustrating a configuration of a loudspeaker system according to a first example of the third exemplary embodiment. The loudspeaker system in FIG. 24 is configured similarly to the loudspeaker system in FIG. 13 besides provision of coupling member 23 instead of coupling member 21 in FIG. 13.

In the third exemplary embodiment, as will be described below, buckling distortion is used to stabilize breaking strength.

Figure 25:
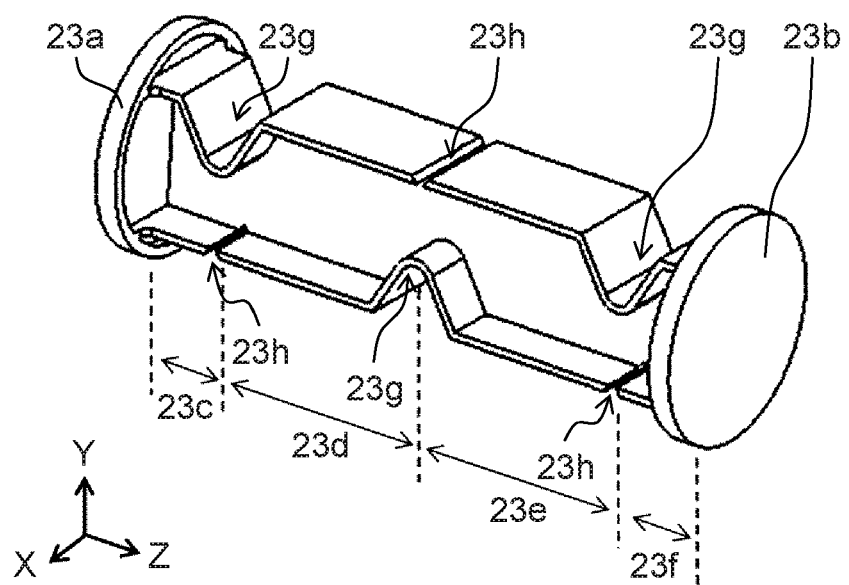
FIG. 25 is a perspective view illustrating a detailed configuration of a coupling member of the loudspeaker system in FIG. 24.

FIG. 25 is a perspective view illustrating a detailed configuration of the coupling member of the loudspeaker system in FIG. 24. Coupling member 23 in FIG. 25 includes ends 23a and 23b, and a plurality of portions 23c to 23f coupled to one another between ends 23a and 23b. The plurality of portions 23c to 23f of coupling member 23 are aligned as one line (e.g., along a straight line parallel to a Z axis in FIG. 25) between ends 23a and 23b of coupling member 23, and form a beam structure having a schematic straight-line shape.

One or more cutouts 23g and 23h are formed at a portion having the beam structure where the plurality of portions 23c to 23f of coupling member 23 are coupled to one another. In an example in FIG. 25, a plurality of large cutouts 23g each having a V shape and a plurality of small cutouts 23h are formed, and are alternately disposed along a longitudinal direction (a Z direction in FIG. 25) of coupling member 23. A distal end of each of cutouts 23g is formed into a curved shape, and is configured with an R surface having predetermined radius of curvature ρg, for example. A distal end of each of cutouts 23h is formed into a curved shape, and is configured with an R surface having predetermined radius of curvature ρh, for example.

The plurality of portions 23c to 23f of coupling member 23 are configured with a thin plate and libs, for example. In the example in FIG. 25, the plurality of portions 23c to 23f of coupling member 23 include a thin plate parallel to a Y-Z plane and libs orthogonal to the Y-Z plane. The plurality of portions 23c to 23f of coupling member 23 are formed as a beam having an H-shaped section. Note that each 11b is cut at positions of small cutouts 23h, and coupling member 23 has a T-shaped section at those positions. The plurality of cutouts 23g and 23h are alternately disposed along the longitudinal direction of coupling member 23. Accordingly, when external force is applied to coupling member 23 in the longitudinal direction, a neutral position of a section of a beam structured portion is not constant in the longitudinal direction, so that coupling member 23 is easily bent in a predetermined direction orthogonal to the external force. In other words, even with small external force, the buckling distortion stably occurs in the predetermined direction. Accordingly, when external force larger than the breaking strength of coupling member 23 is applied to coupling member 23, the buckling distortion in which the beam structured portion of coupling member 23 is bent occurs, thereby shortening a distance between ends 23a and 23b of coupling member 23. Shapes and thicknesses of the libs in the plurality of portions 23c to 23f of coupling member 23, a shape of each of cutouts 23g and 23h, values of radiuses of curvature ρg and ρh, and other factors are adjusted such that the breaking strength, coupling rigidity, and buckling load of coupling member 23 become desired values.

Coupling member 23 having the configuration in FIG. 25 can achieve breaking strength smaller than attachment strength of loudspeaker drive unit 14.

[3-2-2. Operation of First Example]

Figure 26:
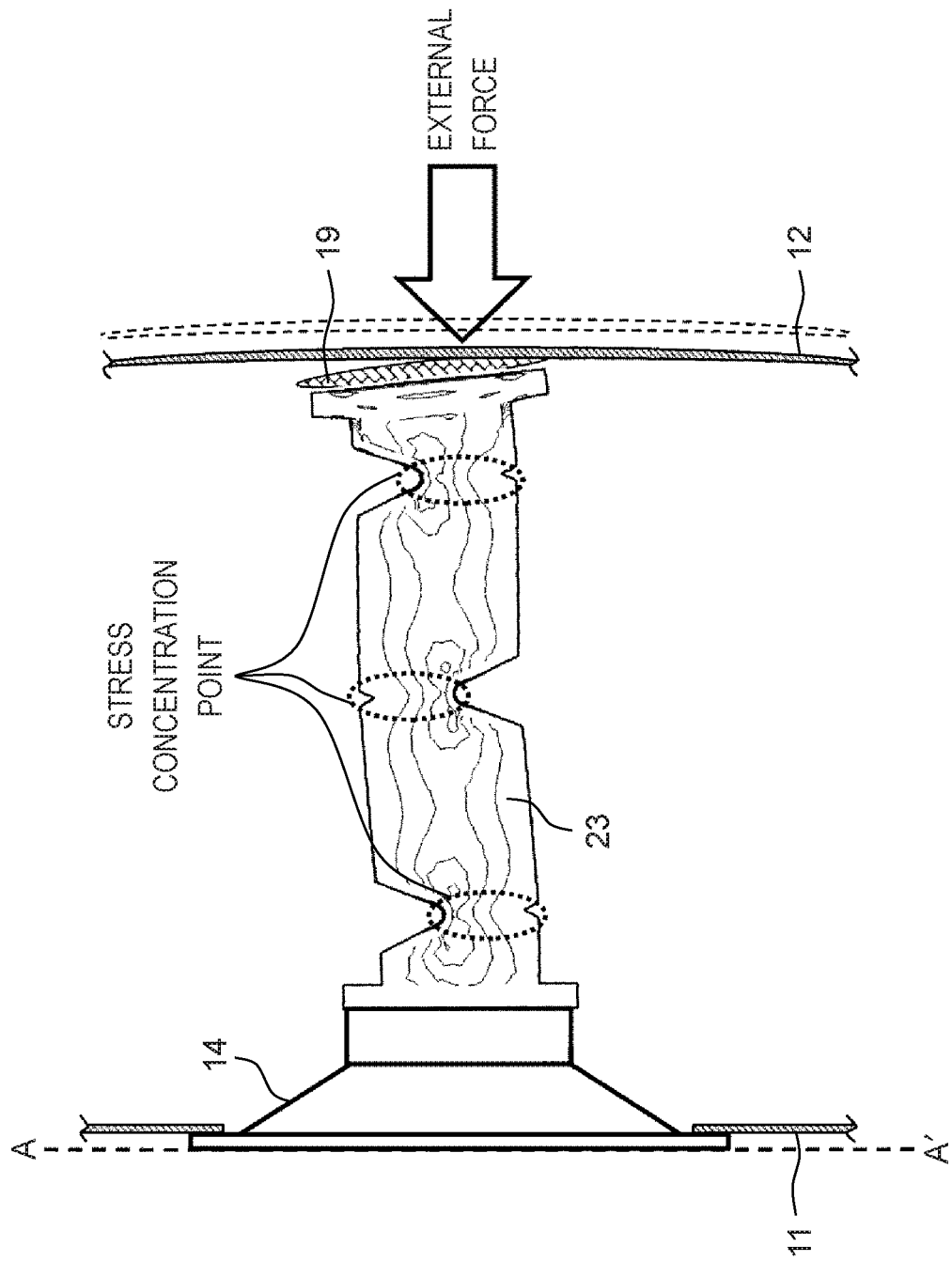
FIG. 26 is a schematic diagram illustrating a state when external force is applied to the loudspeaker system in FIG. 24.

FIG. 26 is a schematic diagram illustrating a state when external force is applied to the loudspeaker system in FIG. 24. To secure safety of automobile 1, loudspeaker drive unit 14 is required not to project into a left side of line A-A' in FIG. 26 (i.e., into the cabin). In a case where the breaking strength of coupling member 23 is smaller than the attachment strength of loudspeaker drive unit 14, as illustrated in FIG. 26, when external force is applied to outer panel 12, upward projecting buckling distortion occurs and stress concentrates at the points where the plurality of portions of coupling member 23 are coupled to one another (i.e., the points formed with the cutouts) even if the external force is small. When still larger external force is applied to outer panel 12, coupling member 23 is broken from the points where stress concentrates. Accordingly, in a case in FIG. 26, even when external force is applied to outer panel 12, coupling member 23 is broken, so that loudspeaker drive unit 14 does not protrude into the left side of line A-A.

The loudspeaker system in FIG. 23 includes coupling member 23 that is irreversibly deformed or broken by external force. This can improve reproduced sound quality more than conventional sound quality without impairing safety of a vehicle.

[3-3-1. Configuration of Second Example]

Figure 27:
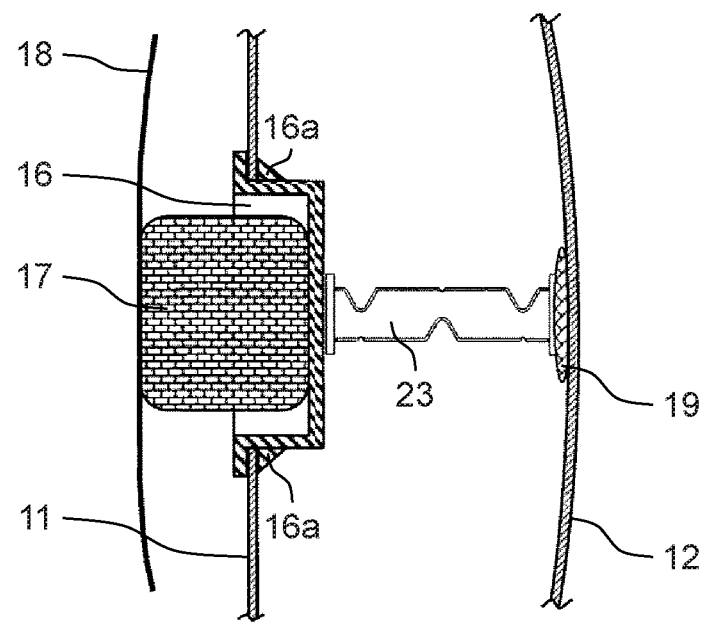
FIG. 27 is a sectional view illustrating a configuration of a loudspeaker system according to a second example of the third exemplary embodiment.

FIG. 27 is a sectional view illustrating a configuration of a loudspeaker system according to a second example of the third exemplary embodiment. The loudspeaker system in FIG. 27 is configured similarly to the loudspeaker system in FIG. 17 besides provision of coupling member 23 instead of coupling member 21 in FIG. 17.

Coupling member 23 of the loudspeaker system in FIG. 27 having the configuration in FIG. 25 can achieve breaking strength smaller than attachment strength of lid member 16.

[3-3-2. Operation of Second Example]

To secure safety of automobile 1, lid member 16 is required not to project into the cabin. In a case where the breaking strength of coupling member 23 is smaller than the attachment strength of lid member 16, when external force is applied to outer panel 12, stress concentrates at the points where the plurality of portions of coupling member 23 are coupled to one another (i.e., the points formed with the cutouts), similarly to the case in FIG. 26. When still larger external force is applied to outer panel 12, coupling member 23 is broken from the points where stress concentrates. Accordingly, in the case of FIG. 27, even when external force is applied to outer panel 12, coupling member 23 is broken, so that lid member 16 does not project into the cabin.

The loudspeaker system in FIG. 27 includes coupling member 23 that is irreversibly deformed or broken by external force. This can improve reproduced sound quality more than conventional sound quality without impairing safety of a vehicle.

3-4. Effects and Others

In a loudspeaker system according to an aspect of the present disclosure, a plurality of positions 23c to 23f of coupling member 23 are aligned as one line between a first and second ends of coupling member 23. One or more cutouts 23g and 23h are formed at positions where the plurality of portions 23c to 23f of coupling member 23 are coupled to one another.

This can provide coupling member 23 that has a smaller sectional area and a simpler structure than those of coupling members 21 and 22 according to the first and second exemplary embodiments, and is easily manufactured.

4. Fourth Exemplary Embodiment

Hereinafter, a fourth exemplary embodiment will be described with reference to FIG. 28 to FIG. 31.

[4-2-1. Configuration of First Example]

Figure 28:
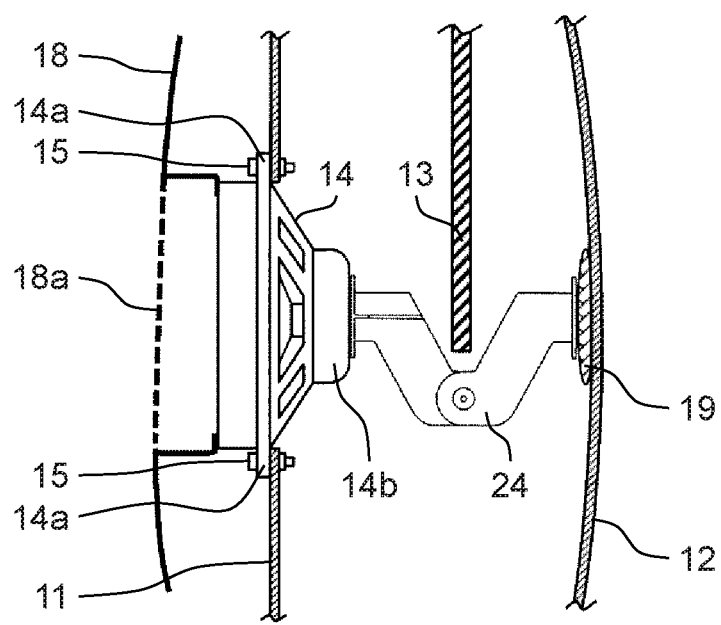
FIG. 28 is a sectional view illustrating a configuration of a loudspeaker system according to a first example of a fourth exemplary embodiment.

FIG. 28 is a sectional view illustrating a configuration of a loudspeaker system according to a first example of the fourth exemplary embodiment. The loudspeaker system in FIG. 28 is configured similarly to the loudspeaker system in FIG. 13 besides provision of coupling member 24 instead of coupling member 21 in FIG. 13.

Figure 29B:
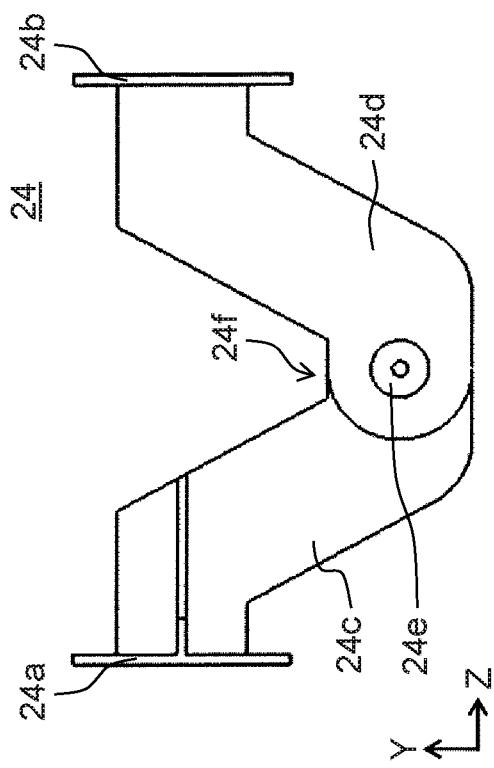
FIG. 29B is a diagram illustrating the detailed configuration of the coupling member of the loudspeaker system in FIG. 28, which is a side view of the coupling member.
Figure 29A:
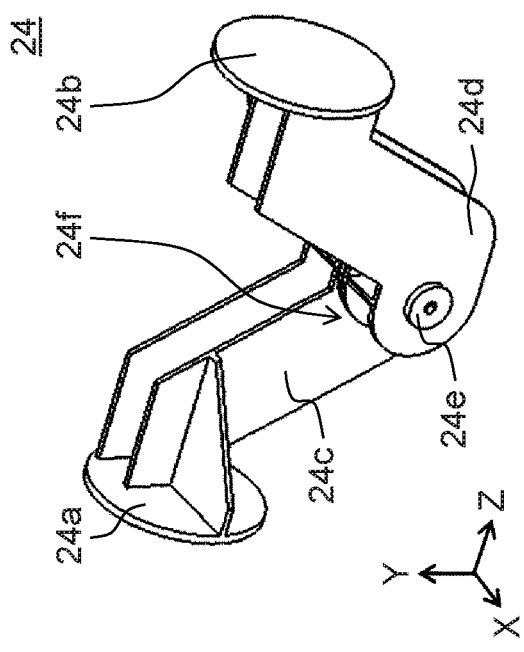
FIG. 29A is a diagram illustrating a detailed configuration of a coupling member of the loudspeaker system in FIG. 28, which is a perspective view of the coupling member.
Figure 29D:
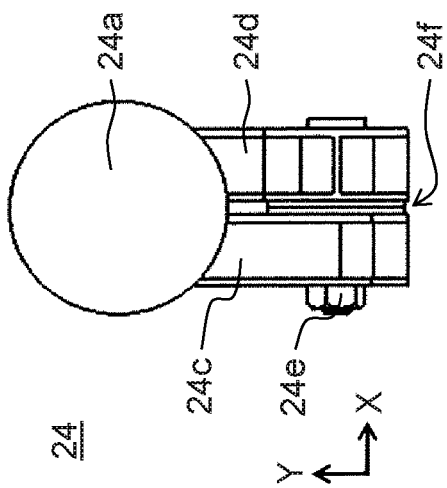
FIG. 29D is a diagram illustrating the detailed configuration of the coupling member of the loudspeaker system in FIG. 28, which is a front view of the coupling member.
Figure 29C:
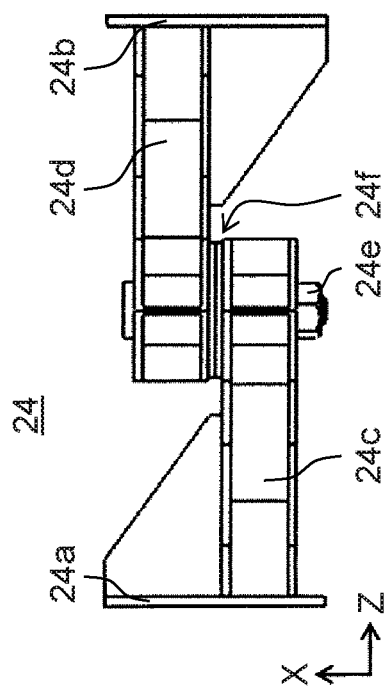
FIG. 29C is a diagram illustrating the detailed configuration of the coupling member of the loudspeaker system in FIG. 28, which is a bottom view of the coupling member.

FIG. 29A to FIG. 29D each illustrate a detailed configuration of the coupling member of the loudspeaker system in FIG. 28. FIG. 29A is a perspective view of the coupling member. FIG. 29B is a side view of the coupling member. FIG. 29C is a bottom view of the coupling member. FIG. 29D is a front view of the coupling member. Coupling member 24 in FIG. 29A includes ends 24a and 24b, and first and second portions 24c and 24d coupled to ends 24a and 24b, respectively. Portions 24c and 24d of coupling member 24 each have friction surfaces 24f that are in contact with each other while facing each other at a center of coupling member 24 in a longitudinal direction. Friction surfaces 24f each have predetermined frictional force to be coupled to each other. Portions 24c and 24d of coupling member 24 each have through-holes at positions that are in contact with each other while facing each other. Portions 24c and 24d of coupling member 24 are fastened to each other by fastening member 24e including a bolt and a nut via those through-holes. Portions 24c and 24d of coupling member 24 are fastened to each other by fastening member 24e such that an angle formed with portions 24c and 24d becomes a desired initial value. Fastening force of fastening member 24e is adjusted such that breaking strength of coupling member 24 becomes a desired value. Herein, the breaking strength of coupling member 24 indicates magnitude of force with which the angle formed with portions 24c and 24d of coupling member 24 begins to change, and is determined by static frictional force between portions 24c and 24d of coupling member 24. In this manner, portions 24c and 24d of coupling member 24 are fastened to each other by fastening member 24e to be fastened to each other with variable frictional force.

When fastened to each other, portions 24c and 24d of coupling member 24 are bent such that another component can intersect a line segment connecting ends 24a and 24b of coupling member 24. For example, portions 24c and 24d of coupling member 24 are formed into a V shape. Shapes and dimensions of portions 24c and 24d of coupling member 24 are adjusted such that coupling member 24 does not touch a lowermost end of window glass 13 when window glass 13 descends and is incorporated in door 3A, as illustrated in FIG. 18.

Portions 24c and 24d of coupling member 24 are configured with thin plates and libs, for example. In the example in FIG. 29A, portions 24c and 24d of coupling member 24 include thin plates parallel to a Y-Z plane and libs orthogonal to the Y-Z plane. Portions 24c and 24d of coupling member 24 are formed as beams each having an H-shaped section. As illustrated in FIG. 29C, coupling member 24 is configured to be point symmetry when viewed from above. With this configuration, when external force is applied to coupling member 24, the angle formed with portions 24c and 24d of coupling member 24 can be changed within a predetermined angle range, while portions 24c and 24d of coupling member 24 do not collide with each other. The angle formed with portions 24c and 24d of coupling member 24 thus changed shortens a distance between ends 24a and 24b of coupling member 24. Shapes and thicknesses of the libs in portions 24c and 24d of coupling member 24, the fastening force of fastening member 24e, a shape, size, and material of friction surfaces 24f, and other factors are adjusted such that the breaking strength and coupling rigidity of coupling member 24 become desired values. Particularly, even after design is fixed, the fastening force (torque) of fastening member 24e including the bolt and the nut can be controlled. This can control the breaking strength to be a predetermined value.

Coupling member 24 having the configuration in FIG. 29A to FIG. 29D can achieve breaking strength smaller than attachment strength of loudspeaker drive unit 14.

[4-2-2. Operation of First Example]

Figure 30:
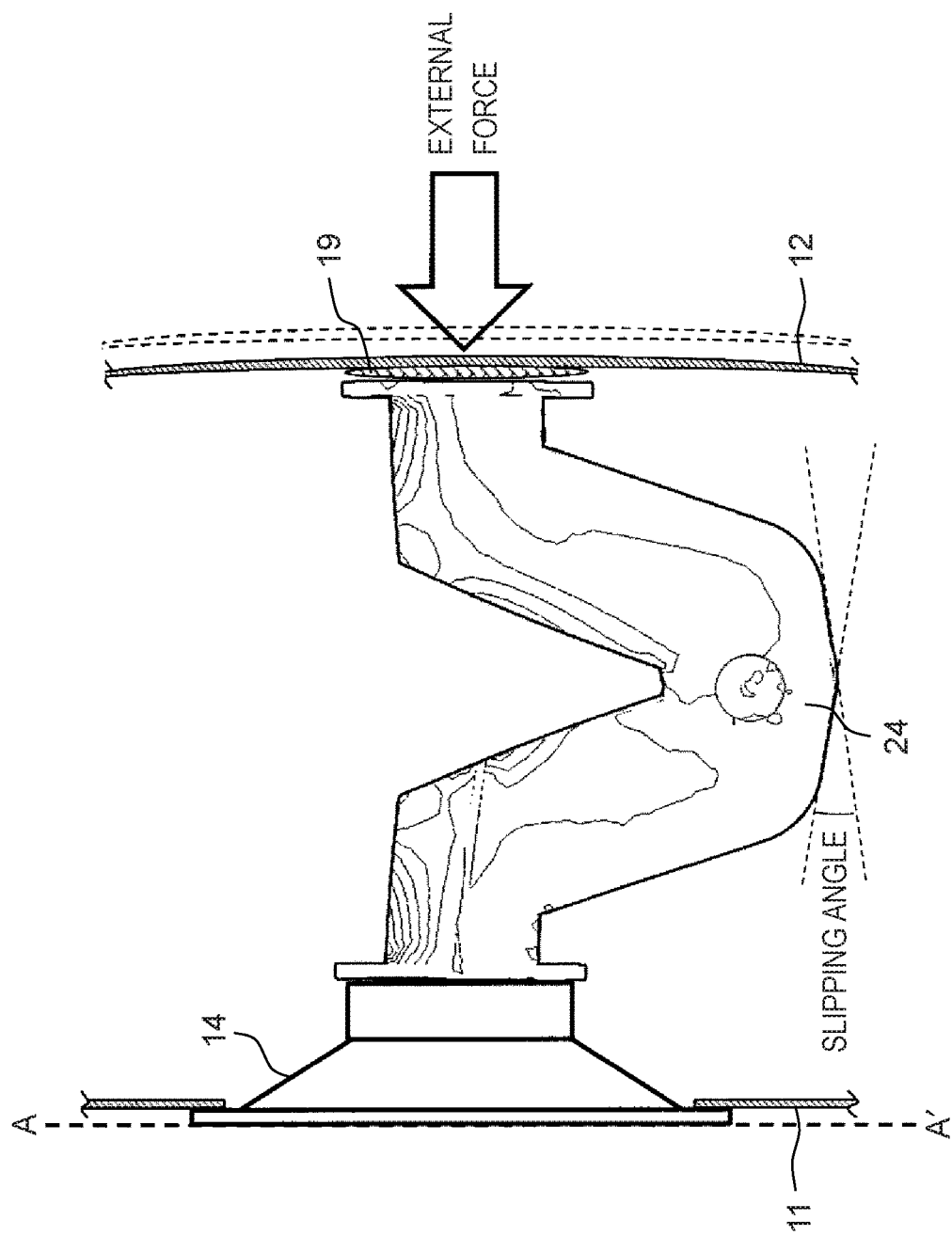
FIG. 30 is a schematic diagram illustrating a state when external force is applied to the loudspeaker system in FIG. 28.

FIG. 30 is a schematic diagram illustrating a state when external force is applied to the loudspeaker system in FIG. 28. To secure safety of automobile 1, loudspeaker drive unit 14 is required not to project into a left side of line A-A' in FIG. 30 (i.e., into the cabin). In a case where the breaking strength of coupling member 24 is smaller than the attachment strength of loudspeaker drive unit 14, when external force applied to outer panel 12 and transmitted to coupling member 24 reaches the breaking strength of coupling member 24, the angle formed with portions 24c and 24d of coupling member 24 is changed as illustrated in FIG. 30. When still larger external force is applied to outer panel 12, the angle formed with portions 24c and 24d of coupling member 24 is further changed. Accordingly, in a case in FIG. 30, even when external force is applied to outer panel 12, coupling member 24 is broken, so that loudspeaker drive unit 14 does not protrude into the left side of line A-A'.

The loudspeaker system in FIG. 28 includes coupling member 24 that is irreversibly deformed or broken by external force. This can improve reproduced sound quality more than conventional sound quality without impairing safety of a vehicle.

[4-3-1. Configuration of Second Example]

Figure 31:
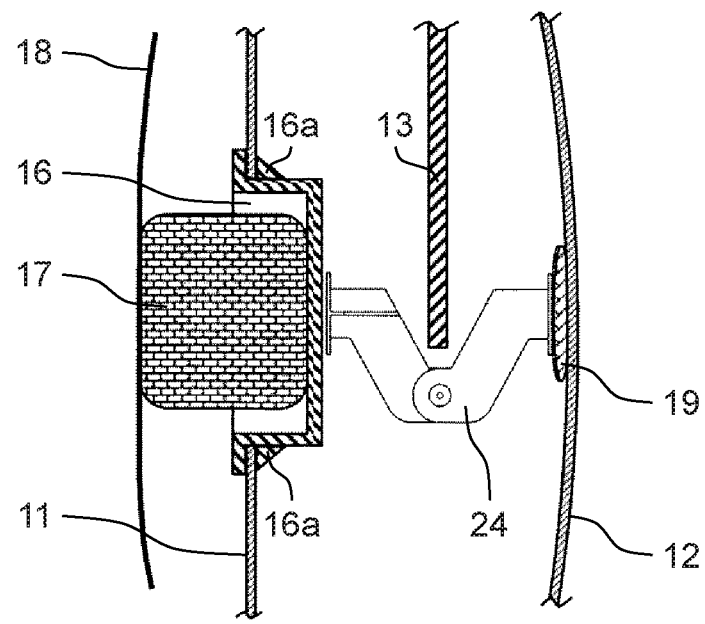
FIG. 31 is a sectional view illustrating a configuration of a loudspeaker system according to a second example of the fourth exemplary embodiment.

FIG. 31 is a sectional view illustrating a configuration of a loudspeaker system according to a second example of the fourth exemplary embodiment. The loudspeaker system in FIG. 31 is configured similarly to the loudspeaker system in FIG. 17 besides provision of coupling member 24 instead of coupling member 21 in FIG. 17.

Coupling member 24 of the loudspeaker system in FIG. 31 having the configuration in FIG. 29A to FIG. 29D can achieve breaking strength smaller than attachment strength of lid member 16.

[4-3-2. Operation of Second Example]

To secure safety of automobile 1, lid member 16 is required not to project into the cabin. In a case where the breaking strength of coupling member 24 is smaller than the attachment strength of lid member 16, when external force applied to outer panel 12 and transmitted to coupling member 24 reaches the breaking strength of coupling member 24, the angle formed with portions 24c and 24d of coupling member 24 is changed similarly to FIG. 30. When still larger external force is applied to outer panel 12, the angle formed with portions 24c and 24d of coupling member 24 is further changed. Accordingly, in the case of FIG. 31, even when external force is applied to outer panel 12, coupling member 24 is broken, so that lid member 16 does not project into the cabin.

The loudspeaker system in FIG. 31 includes coupling member 24 that is irreversibly deformed or broken by external force. This can improve reproduced sound quality more than conventional sound quality without impairing safety of a vehicle.

4-4. Effects and Others

In a loudspeaker system according to an aspect of the present disclosure, coupling member 24 includes first and second portions 24c and 24d. First and second portions 24c and 24d of coupling member 24 are fastened to each other by fastening member 24e to generate variable frictional force between those first and second portions 24c and 24d.

With this configuration, coupling member 24 has friction surfaces that are retained by the frictional force. Therefore, when the frictional force (e.g., fastening torque of the bolt) is adjusted, any breaking strength can be set.

In a loudspeaker system according to an aspect of the present disclosure, coupling member 24 may be formed such that coupling member 24 is bent to allow another component to intersect a line segment connecting first and second ends of coupling member 24.

With this configuration, when window grass 13 descends, window grass 13 can be prevented from colliding with coupling member 24.

5. Fifth Exemplary Embodiment

Hereinafter, a fifth exemplary embodiment will be described with reference to FIG. 32 to FIG. 35.

[5-2-1. Configuration of First Example]

Figure 32:
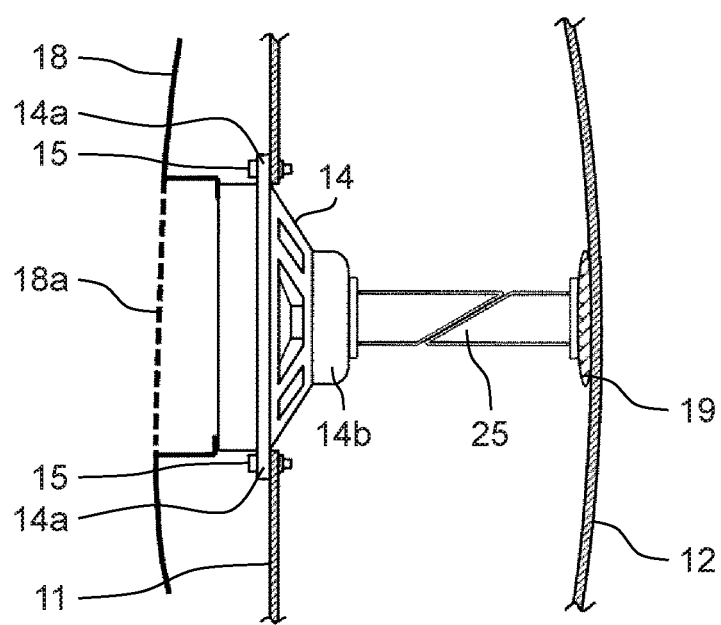
FIG. 32 is a sectional view illustrating a configuration of a loudspeaker system according to a first example of a fifth exemplary embodiment.

FIG. 32 is a sectional view illustrating a configuration of a loudspeaker system according to a first example of the fifth exemplary embodiment. The loudspeaker system in FIG. 32 is configured similarly to the loudspeaker system in FIG. 13 besides provision of coupling member 25 instead of coupling member 21 in FIG. 13.

Figure 33B:
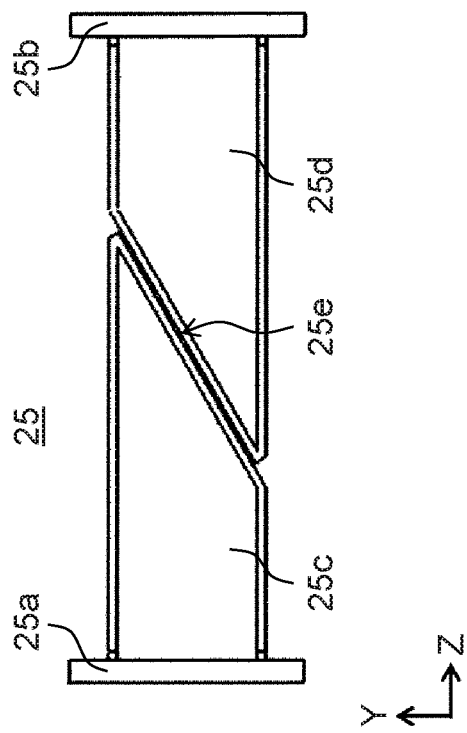
FIG. 33B is a diagram illustrating the detailed configuration of the coupling member of the loudspeaker system in FIG. 32, which is a side view of the coupling member.
Figure 33A:
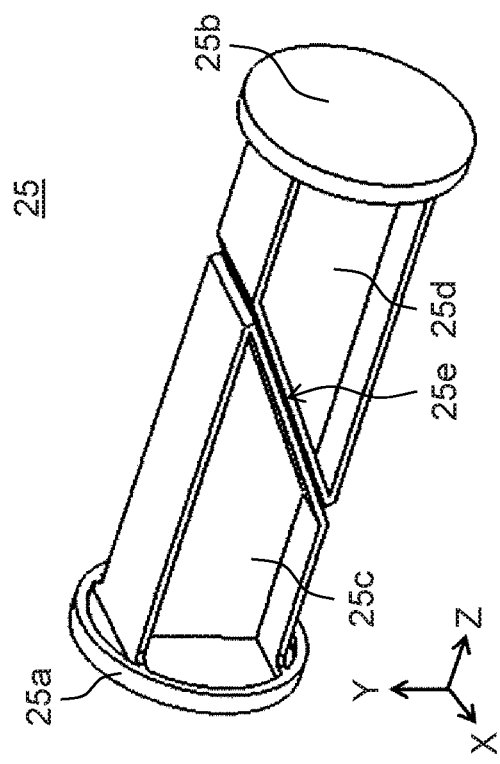
FIG. 33A is a diagram illustrating a detailed configuration of a coupling member of the loudspeaker system in FIG. 32, which is a perspective view of the coupling member.
Figure 33D:
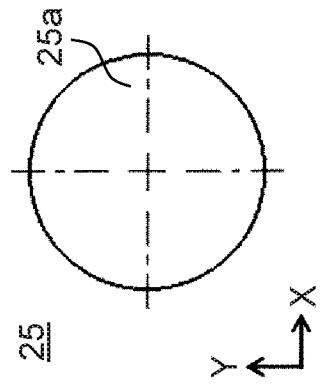
FIG. 33D is a diagram illustrating the detailed configuration of the coupling member of the loudspeaker system in FIG. 32, which is a front view of the coupling member.
Figure 33C:
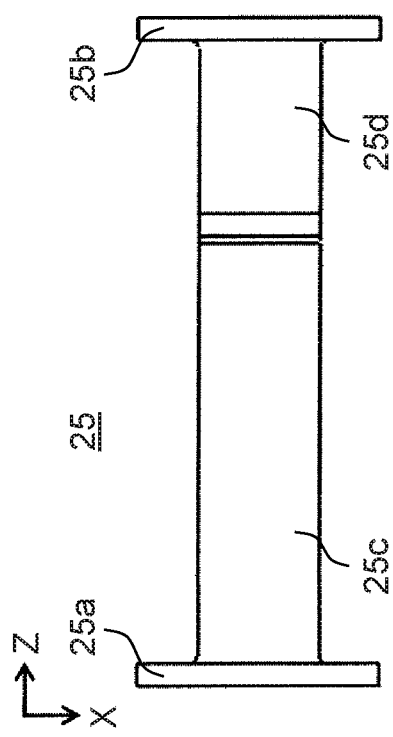
FIG. 33C is a diagram illustrating the detailed configuration of the coupling member of the loudspeaker system in FIG. 32, which is a top view of the coupling member.

FIG. 33A to FIG. 33D each illustrate a detailed configuration of the coupling member of the loudspeaker system in FIG. 32. FIG. 33A is a perspective view of the coupling member. FIG. 33B is a side view of the coupling member. FIG. 33C is a top view of the coupling member. FIG. 33D is a front view of the coupling member. Coupling member 25 in FIG. 33A includes ends 25a and 25b, and first and second portions 25c and 25d coupled to ends 25a and 25b, respectively. First and second portions 25c and 25d of coupling member 25 each have slopes that diagonally intersect a straight line passing through ends 25a and 25b of coupling member 25, and are bonded to each other by an adhesive at the slopes.

In this specification, the "straight line passing through ends 25a and 25b of coupling member 25" indicates a straight line passing through any point in end 25a of coupling member 25 and any point in end 25b of coupling member 25. This straight line may pass through a center of a region where end 25a of coupling member 25 is brought into contact with inner panel 11 and a center of a region where end 25b of coupling member 25 is brought into contact with outer panel 12, for example. Alternatively, this straight line may pass through a point other than the center in at least one of those regions. This straight line may orthogonally intersect at least one of inner panel 11 and outer panel 12, or may intersect at least one of inner panel 11 and outer panel 12 at a predetermined angle larger than 0 degrees and smaller than 90 degrees.

In FIG. 33A and FIG. 33B, the slopes of portions 25c and 25d of coupling member 25, which are boned to each other, are indicated as bonded surface 25e. The slopes of portions 25c and 25d of coupling member 25 are formed to be flat, for example. Material characteristics of the adhesive, a thickness of the adhesive, a shape of a region to which the adhesive is applied, and other factors are adjusted or selected such that breaking strength and coupling rigidity of coupling member 25 become desired values. Herein, the breaking strength of coupling member 25 indicates magnitude of force with which portions 25c and 25d of coupling member 25 bonded to each other begin to mutually deviate, or are completely separated from each other. Portions 25c and 25d of coupling member 25 bonded to each other, which are mutually deviated, or are completely separated from each other, shorten a distance between ends 25a and 25b of coupling member 25.

Portions 25c and 25d of coupling member 25 are configured with thin plates and libs, for example. In the example in FIG. 33A, portions 25c and 25d of coupling member 25 include thin plates parallel to a Y-Z plane and libs orthogonal to the Y-Z plane. Portions 25c and 25d of coupling member 25 are formed as beams each having an H-shaped section. Shapes and thicknesses of the libs in portions 25c and 25d of coupling member 25, and other factors are adjusted such that the breaking strength and coupling rigidity of coupling member 25 become desired values.

Coupling member 25 having the configuration in FIG. 33A to FIG. 33D can achieve breaking strength smaller than attachment strength of loudspeaker drive unit 14.

[5-2-2. Operation of First Example]

FIG. 34 is a schematic diagram illustrating a state when external force is applied to the loudspeaker system in FIG. 32. To secure safety of automobile 1, loudspeaker drive unit 14 is required not to project into a left side of line A-A' in FIG. 34 (i.e., into the cabin). In a case where the breaking strength of coupling member 25 is smaller than the attachment strength of loudspeaker drive unit 14, when external force applied to outer panel 12 and transmitted to coupling member 25 reaches the breaking strength of coupling member 25, portions 25c and 25d of coupling member 25 bonded to each other mutually deviate as illustrated in FIG. 34. When still larger external force is applied to outer panel 12, portions 25c and 25d of coupling member 25 are completely separated from each other. Accordingly, in a case in FIG. 34, even when external force is applied to outer panel 12, coupling member 25 is broken, so that loudspeaker drive unit 14 does not protrude into the left side of line A-A.

The loudspeaker system in FIG. 32 includes coupling member 25 that is irreversibly deformed or broken by external force. This can improve reproduced sound quality more than conventional sound quality without impairing safety of a vehicle.

[5-3-1. Configuration of Second Example]

Figure 35:
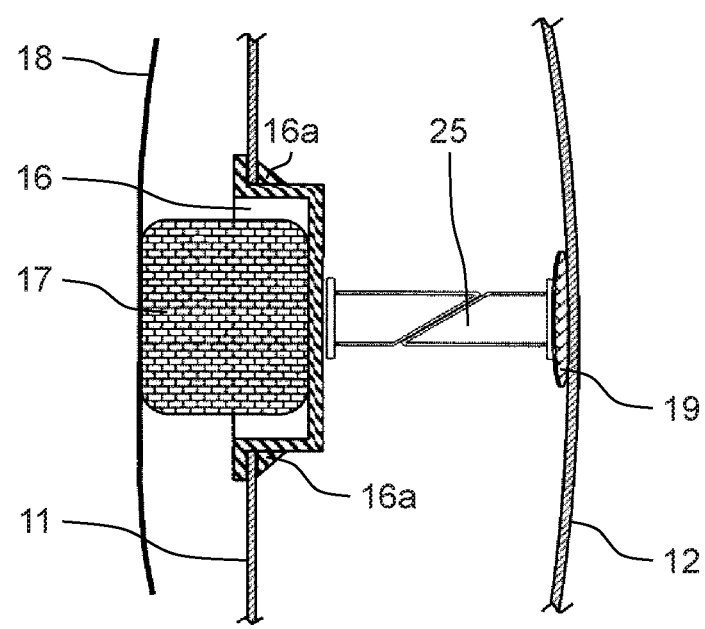
FIG. 35 is a sectional view illustrating a configuration of a loudspeaker system according to a second example of the fifth exemplary embodiment.

FIG. 35 is a sectional view illustrating a configuration of a loudspeaker system according to a second example of the fifth exemplary embodiment. The loudspeaker system in FIG. 35 is configured similarly to the loudspeaker system in FIG. 17 besides provision of coupling member 25 instead of coupling member 21 in FIG. 17.

Coupling member 25 of the loudspeaker system in FIG. 35 having the configuration in FIG. 35 can achieve breaking strength smaller than attachment strength of lid member 16.

[5-3-2. Operation of Second Example]

To secure safety of automobile 1, lid member 16 is required not to project into the cabin. In a case where the breaking strength of coupling member 25 is smaller than the attachment strength of lid member 16, when external force applied to outer panel 12 and transmitted to coupling member 25 reaches the breaking strength of coupling member 25, portions 25c and 25d of coupling member 25 bonded to each other mutually deviate similarly to the case in FIG. 34. When still larger external force is applied to outer panel 12, portions 25c and 25d of coupling member 25 are completely separated from each other. Accordingly, in the case of FIG. 35, even when external force is applied to outer panel 12, coupling member 25 is broken, so that lid member 16 does not project into the cabin.

The loudspeaker system in FIG. 35 includes coupling member 25 that is irreversibly deformed or broken by external force. This can improve reproduced sound quality more than conventional sound quality without impairing safety of a vehicle.

5-4. Effects and Others

In a loudspeaker system according to an aspect of the present disclosure, coupling member 25 includes first and second portions 25c and 25d. First and second portions 25c and 25d of coupling member 25 each have slopes that diagonally intersect a straight line passing through first and second ends 25a and 25b of coupling member 25, and are bonded to each other by an adhesive at the slopes.

This can provide coupling member 25 that has a simpler structure than those of coupling members 21 to 24 according to the first and fourth exemplary embodiments, and is easily manufactured.

6. Other Exemplary Embodiments

The first to fifth exemplary embodiments have been described above to exemplify the technique disclosed in the present application. However, the technique of the present disclosure is not limited to the first to fifth exemplary embodiments, and also applicable to other exemplary embodiments that undergo some modifications, replacements, additions, and omissions, for example, as appropriate. A new exemplary embodiment can also be provided by combining the respective configuration elements described in the above first to fifth exemplary embodiments.

In the first to fifth exemplary embodiments, a case where coupling members 21 to 25 are indirectly coupled to inner panel 11 via loudspeaker drive unit 14 or lid member 16 has been mainly described, but coupling members 21 to 25 may be directly coupled to inner panel 11. In this case, coupling members 21 to 25 respectively include the configurations described in the first to fifth exemplary embodiments, so that breaking strength smaller than breaking strength of inner panel 11 can be achieved. To secure safety of automobile 1, inner panel 11 is required not to project into the cabin. When breaking strength of coupling members 21 to 25 is smaller than the breaking strength of inner panel 11, even when external force is applied to outer panel 12, coupling members 21 to 25 are broken, so that inner panel 11 does not project into the cabin.

As described above, the exemplary embodiments have been described as examples of the technique of the present disclosure. For this purpose, the accompanying drawings and the detailed description have been provided.

Accordingly, in order to exemplify the technique described above, the components described in the accompanying drawings and the detailed description may not only include components that are essential for solving the problems, but also include components that are not essential for solving the problems as examples of the above-described technique. Therefore, the unessential components should not be deemed essential just because the unessential components are included in the accompanying drawings and the detailed description.

Each exemplary embodiment described above is provided to exemplify the technique according to the present disclosure. Therefore, it is possible to make various changes, replacements, additions, omissions, and the like within the scope of the claims and equivalents thereof.

INDUSTRIAL APPLICABILITY

In the present disclosure, an example in which a loudspeaker system is mounted in a door of an automobile, but a place for mounting the loudspeaker system is not limited to the door of the automobile. A loudspeaker system according to an aspect of the present disclosure is applicable to any vehicle in which an inner panel and an outer panel is provided, and external force is possibly applied to the outer panel.

What is claimed is:

1. A loudspeaker system comprising:
a housing including a first housing portion and a second housing portion that are plate-shaped and face each other;
a loudspeaker drive unit fixed to the first housing portion; and
a coupling member that is rigid and couples the first housing portion and the second housing portion to each other inside the housing, wherein
the coupling member includes, a first end, a second end, a first end coupling portion that is directly or indirectly coupled to the first housing portion, and a second end coupling portion that is directly or indirectly coupled to the second housing portion, and
when second force is applied to the coupling member, the second force being smaller than first force that would irreversibly break the first end coupling portion between the coupling member and the first housing portion, the coupling member is irreversibly broken so as to shorten a distance between the first end and the second end of the coupling member and decouples the first housing portion and the second housing portion from each other inside the housing.

2. The loudspeaker system according to claim 1, wherein
the coupling member is configured with a plurality of portions that are coupled to each other, and
at least one cutout or hole is formed at each of positions where the plurality of portions of the coupling member are coupled to each other.

3. The loudspeaker system according to claim 2, wherein a plurality of holes disposed at predetermined intervals are formed, at each of the positions where the plurality of portions of the coupling member are coupled to each other.

4. The loudspeaker system according to claim 2, wherein
the plurality of portions of the coupling member are aligned as one line between the first end and the second end of the coupling member, and
at least one cutout is formed at each of the positions where the plurality of portions of the coupling member are coupled to each other.

5. The loudspeaker system according to claim 2, wherein the coupling member is formed such that the coupling member is bent to allow another component to intersect a line segment connecting the first end and second end of the coupling member.

6. The loudspeaker system according to claim 1, wherein
each of the plurality of portions of the coupling member include a longitudinal portion extending parallel to a straight line passing through the first end and the second end of the coupling member, and
a longitudinal portion of one of the plurality of portions is coupled to a longitudinal portion of another one of the plurality of portions.

7. The loudspeaker system according to claim 1, wherein
the coupling member includes a first portion and a second portion, and
the first portion and the second portion of the coupling member are fastened to each other by a fastening member to generate variable frictional force between the first portion and the second portion.

8. The loudspeaker system according to claim 1, wherein
the coupling member includes a first portion and a second portion, and
the first portion and the second portion of the coupling member each have slopes that diagonally intersect a straight line passing through the first end and the second end of the coupling member, and are bonded to each other by an adhesive at the slopes.

9. The loudspeaker system according to claim 1, wherein the first end of the coupling member is coupled to the loudspeaker drive unit to be indirectly coupled to the first housing portion.

10. The loudspeaker system according to claim 9claim 1, wherein the coupling member and the loudspeaker drive unit are integrally formed.

11. The loudspeaker system according to claim 1, wherein
the housing includes a third housing portion fixed to the first housing portion, and
the first end of the coupling member is coupled to the third housing portion to be indirectly coupled to the first housing portion.

12. The loudspeaker system according to claim 11, wherein the coupling member and the third housing portion are integrally formed.

13. The loudspeaker system according to claim 1, wherein the first end of the coupling member is directly coupled to the first housing portion.

14. The loudspeaker system according to claim 1, wherein the second end of the coupling member is indirectly coupled to the second housing portion via a flexible member.

15. The loudspeaker system according to claim 1, wherein
the loudspeaker system is disposed in a vehicle, and
the first housing portion is disposed inward from the second housing portion in a body of the vehicle.

16. The loudspeaker system according to claim 15, wherein the housing is disposed in a door of the vehicle.

17. An audio system comprising:
the loudspeaker system according to claim 1; and
an audio signal processing device connected to the loudspeaker system.

18. A loudspeaker system component for a loudspeaker system including a housing including a first housing portion and a second housing portion that are plate-shaped and face each other, and a loudspeaker drive unit fixed to the first housing portion, the loudspeaker system component comprising
a coupling member that is rigid and couples the first housing portion and the second housing portion to each other inside the housing, wherein
the coupling member includes, a first end, a second end, a first end coupling portion that is directly or indirectly coupled to the first housing portion, and a second end coupling portion that is directly or indirectly coupled to the second housing portion, and
when second force is applied to the coupling member, the second force being smaller than first force that would irreversibly break the first end coupling portion between the coupling member and the first housing portion, the coupling member is irreversibly broken so as to shorten a distance between the first end and the second end of the coupling member and decouples the first housing portion and the second housing portion from each other inside the housing.

19. The loudspeaker system component according to claim 18, wherein the first end of the coupling member is coupled to the loudspeaker drive unit to be indirectly coupled to the first housing portion.

20. The loudspeaker system component according to claim 19, further comprising the loudspeaker drive unit,
wherein the coupling member and the loudspeaker drive unit are integrally formed.

* * * * *